(12) United States Patent
Su et al.

(10) Patent No.: US 10,868,304 B2
(45) Date of Patent: Dec. 15, 2020

(54) BATTERY HAVING A LOW OUTPUT VOLTAGE

(71) Applicant: Nanotek Instruments, Inc., Dayton, OH (US)

(72) Inventors: Yu-Sheng Su, Dayton, OH (US); Minjie Li, Dayton, OH (US); Hui He, Dayton, OH (US); Qing Fang, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 263 days.

(21) Appl. No.: 15/297,877

(22) Filed: Oct. 19, 2016

(65) Prior Publication Data

US 2018/0108909 A1  Apr. 19, 2018

(51) Int. Cl.
*H01M 4/00* (2006.01)
*H01M 4/52* (2010.01)
(Continued)

(52) U.S. Cl.
CPC .............. *H01M 4/523* (2013.01); *H01M 4/38* (2013.01); *H01M 4/381* (2013.01); *H01M 4/382* (2013.01); *H01M 4/463* (2013.01); *H01M 4/466* (2013.01); *H01M 4/483* (2013.01); *H01M 4/502* (2013.01); *H01M 4/5815* (2013.01); *H01M 4/625* (2013.01); *H01M 6/04* (2013.01); *H01M 6/14* (2013.01); *H01M 10/052* (2013.01);
(Continued)

(58) Field of Classification Search
CPC ........ H01M 4/523; H01M 4/38; H01M 4/382; H01M 4/48; H01M 4/5815; H01M 4/663; H01M 4/808; H01M 6/164; H01M 6/166; H01M 2220/30; H01M 2300/0037
See application file for complete search history.

(56) References Cited

U.S. PATENT DOCUMENTS 5,413,881 A  5/1995  Licht et al.
7,071,258 B1  7/2006  Jang et al.
(Continued)

OTHER PUBLICATIONS

F. Karlicky, et al. "Halogenated Graphenes: Rapidly Growing Family of Graphene Derivatives" ACS Nano, 2013, 7 (8), pp. 6434-6464.
(Continued)

*Primary Examiner* — Raymond Alejandro

(57) ABSTRACT

An electrochemical battery cell comprising an anode having a primary anode active material, a cathode, and an ion-conducting electrolyte, wherein the cell has an initial output voltage, Vi, measured at 10% depth of discharge (DoD), selected from a range from 0.3 volts to 0.8 volts, and a final output voltage Vf measured at a DoD no greater than 90%, wherein a voltage variation, (Vi−Vf)/Vi, is no greater than ±10% and the specific capacity between Vi and Vf is no less than 100 mAh/g or 200 mAh/cm³ based on the cathode active material weight or volume, and wherein the primary anode active material is selected from lithium (Li), sodium (Na), potassium (K), magnesium (Mg), aluminum (Al), zinc (Zn), titanium (Ti), manganese (Mn), iron (Fe), vanadium (V), cobalt (Co), nickel (Ni), a mixture thereof, an alloy thereof, or a combination thereof.

13 Claims, 17 Drawing Sheets

Aligned GO molecules

Giant aromatic molecule or graphene plane

Heat-induced chemical linking

(51) Int. Cl.
  *H01M 4/38*   (2006.01)
  *H01M 4/58*   (2010.01)
  *H01M 6/14*   (2006.01)
  *H01M 10/36*  (2010.01)
  *H01M 4/62*   (2006.01)
  *H01M 10/052*  (2010.01)
  *H01M 4/50*   (2010.01)
  *H01M 10/054*  (2010.01)
  *H01M 4/46*   (2006.01)
  *H01M 4/48*   (2010.01)
  *H01M 6/04*   (2006.01)

(52) U.S. Cl.
  CPC ......... *H01M 10/054* (2013.01); *H01M 10/36* (2013.01); *Y02T 10/70* (2013.01)

(56) References Cited

U.S. PATENT DOCUMENTS

2005/0271574 A1 12/2005 Jang et al.
2008/0048152 A1  2/2008 Jang et al.
2018/0102532 A1* 4/2018 Fischer ................ H01M 4/382

OTHER PUBLICATIONS

Gwon et al., "Flexible energy storage devices based on graphene paper" Energy and Environmental Science (2011) vol. 4, pp. 1277-1283.
PCT 1754231 International Search Report Written Opinion dated Dec. 15, 2017, 9 pages.

\* cited by examiner

BATTERY HAVING A LOW OUTPUT VOLTAGE

FIELD OF THE INVENTION

The present invention relates generally to the field of electrochemical battery and, more particularly, to a battery that naturally supplies an external circuit with an output voltage from 0.3 volts to 0.8 volts without using a voltage regulator (e.g. voltage reducer or transformer).

BACKGROUND OF THE INVENTION

The emergence of "Internet-of-Things" and next-generation sensor technologies for health monitoring and artificial intelligence applications demands the availability of batteries that last for many decades without recharging and, in particular, that enable wireless, wearable, or implanted devices to become maintenance-free without replacing the batteries.

Using sensors as an example, it has been determined that the ultra low power monitoring sensor requires low-voltage power sources that can operate between 0.3 and 0.8 V without using a voltage reducer. A lower operating voltage means a lower power consumption rate. The use of a voltage reducer (e.g. a transformer) would mean additional power loss and must be avoided. However, commercially available battery systems are all voltage-mismatched, such as lithium-ion (3.7 V), lead acid (2 V), zinc-carbon/alkaline (1.5 V), zinc-air (1.4 V), and nickel-metal (1.2 V), which would require a voltage reducing circuit to bring the operating voltage to below 0.8 volts. Furthermore, most of these batteries are poor in energy density for lifelong functioning. Additionally, since the size of remote wireless sensors is tiny in most cases, the volumetric energy density of a battery is especially important for sensor devices.

Thus, an urgent need exists for a long-lasting primary battery that operates in a voltage range from 0.3 volts to 0.8 volts and supplies power to a wireless, wearable, or implanted device without using a voltage reducer circuit. Preferably, such a battery system should also allow for flexibility in adjusting the output voltage in response to the various device power design needs.

SUMMARY OF THE INVENTION

Herein reported is an electrochemical battery cell that meets the aforementioned requirements. The battery cell comprises:
(A) an anode having a primary anode active material,
(B) a cathode having a primary cathode active material, and
(C) an ion-conducting electrolyte in ionic contact with the anode and the cathode, wherein the cell has an initial output voltage, Vi, measured at 10% depth of discharge (DoD), from a lower limit of 0.3 volts to an upper limit of 0.8 volts, and a final output voltage Vf measured at a DoD no greater than 90%, wherein a voltage variation, (Vi−Vf)/Vi, is no greater than ±10% (preferably no greater than ±5%) and the specific capacity between Vi and Vf is no less than 100 mAh/g or 200 mAh/cm$^3$ based on the cathode active material weight or volume, and wherein the anode contains lithium (Li), sodium (Na), potassium (K), magnesium (Mg), aluminum (Al), zinc (Zn), titanium (Ti), manganese (Mn), iron (Fe), vanadium (V), cobalt (Co), nickel (Ni), a mixture thereof, an alloy thereof, or a combination thereof as the primary anode active material. The preferred anode active materials are Li, Na, Mg, Al and their alloys or mixtures.

The depth of discharge (DoD) is a term well-known in the art of battery. In short, the DoD is the ratio of the actual discharge amount (specific capacity, in terms of mAh/g or mAh/cm$^3$) to the maximum discharge amount that a battery cell can provide in terms of the cell weight, the anode active material weight, or the cathode active material weight. For example, if metal M (as a cathode active material) relative to Li (as an anode active material, having a sufficient amount to match M) can store up to 1000 mAh of Li ions per gram of M, and this Li/M cell is only allowed to discharge to 900 mAh/g, then this specific capacity of 900 mAh/g corresponds to a DoD of 900/1,000=90%.

When measured at 10% depth of discharge (DoD), the battery cell must deliver an initial output voltage Vi from 0.3 volts to 0.8 volts, preferably from 0.3 volts to 0.7 volts. The battery cell also delivers a final output voltage Vf measured at a DoD no greater than 90% and the specific capacity between Vi and Vf is preferably no less than 100 mAh/g or 200 mAh/cm$^3$ based on the cathode active material weight or volume. Preferably, the voltage variation, (Vi−Vf)/Vi, is no greater than ±10% (further preferably no greater than ±5%) between Vi and the selected Vf. A battery designer or electronic device designer is free to select a Vf at a DoD from 10% to 90%, but the specific capacity delivered by the battery cell between Vi and Vf is preferably no less than 100 mAh/g or 200 mAh/cm$^3$ based on the cathode active material weight or volume.

The electrochemical battery cell may further comprise an anode current collector supporting the anode and/or a cathode current collector supporting the cathode.

The primary cathode active material may be selected from a metal, semi-metal, or non-metal element different than the primary anode active material and the metal, semi-metal, or non-metal element in the cathode is selected from tin (Sn), bismuth (Bi), antimony (Sb), indium (In), tellurium (Te), magnesium (Mg), aluminum (Al), zinc (Zn), titanium (Ti), manganese (Mn), iron (Fe), vanadium (V), cobalt (Co), nickel (Ni), selenium (Se), sulfur (S), a mixture thereof, an alloy thereof, or a combination thereof. The metal, semi-metal, or non-metal used as the primary cathode active material must be different than the metal used as the primary anode active material and, when coupled with the primary anode active material, must be able to deliver an output voltage in the range of 0.3 volts to 0.8 volts.

The primary cathode active material may also be selected from a metal oxide, metal phosphate, or metal sulfide; in particular, it may be selected from a tin oxide, cobalt oxide, nickel oxide, manganese oxide, vanadium oxide, iron phosphate, manganese phosphate, vanadium phosphate, transition metal sulfide, or a combination thereof.

In certain embodiments, the primary cathode active material contains an inorganic material selected from carbon sulfur, sulfur compound, lithium polysulfide, transition metal dichalcogenide, a transition metal trichalcogenide, or a combination thereof.

The electrolyte may be selected from an aqueous, organic, polymeric, ionic liquid, quasi-solid, or solid-state electrolyte.

Preferably, the anode further contains graphene as a protective material to protect the primary anode active material. Further preferably, the primary anode active material is embraced by graphene sheets or embedded in a graphene film, graphene paper, graphene mat, or graphene foam.

The graphene material for use in the anode and/or the cathode may contain a pristine graphene material having less than 0.01% by weight of non-carbon elements or a non-pristine graphene material having 0.01% to 50% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

In certain embodiments, the primary cathode active material is embraced by graphene sheets or embedded in a graphene film, graphene paper, graphene mat, or graphene foam. Preferably, the primary anode active material in the anode is embraced by graphene sheets or embedded in a graphene film, graphene paper, graphene mat, or graphene foam and the primary cathode active material in the cathode is embraced by graphene sheets or embedded in a graphene film, graphene paper, graphene mat, or graphene foam.

In the presently invented battery cell, the graphene film, graphene paper, graphene mat, or graphene foam (having the primary anode active material embedded therein) in the anode is connected to a first battery terminal tab (i.e. the graphene film, paper, mat, or foam itself serving as an anode current collector) and there is no separate or additional anode current collector (e.g. Cu foil) to support the graphene film, graphene paper, graphene mat, or graphene foam. This feature can significantly reduce the battery weight and volume.

In certain embodiments, the graphene film, graphene paper, graphene mat, or graphene foam in the cathode having the primary cathode active material embedded therein is connected to a battery terminal tab (the graphene film, graphene paper, graphene mat, or graphene foam itself acting as a cathode current collector) and there is no separate or additional cathode current collector to support the graphene film, graphene paper, graphene mat, or graphene foam.

Most preferably, the graphene film, graphene paper, graphene mat, or graphene foam in the anode (having a first terminal tab connected thereto) serves as the anode current collector (no additional or separate anode current collector such as Cu foil) and the graphene film, graphene paper, graphene mat, or graphene foam in the cathode (having a second battery terminal tab connected thereto) serves as the cathode current collector and there is no separate or additional cathode current collector (such as Al foil) to support said graphene film, graphene paper, graphene mat, or graphene foam in the cathode. This feature can significantly reduce the battery weight and volume.

Furthermore, the flexibility of the graphene film, graphene paper, graphene mat, or graphene foam in both the anode and the cathode also enables the production of flexible battery cell for use in a wireless, wearable, or implanted device that can be of odd shape.

Preferably, the specific capacity between Vi and Vf is no less than 200 mAh/g or 400 mAh/cm$^3$ (more preferably no less than 300 mAh/g or 600 mAh/cm$^3$ and further preferably no less than 400 mAh/g or 800 mAh/cm$^3$) based on the cathode active material weight or volume.

In certain embodiments, the cathode further contains graphene as an electrochemical property modifier to the primary cathode active material wherein the added graphene increases the cell specific capacity, or increases or decreases a cell output voltage (relative to a corresponding cell without the added graphene in the cathode). Preferably, the primary cathode active material is bonded to or physically supported by a surface of graphene. The graphene may contain a pristine graphene material having less than 0.01% by weight of non-carbon elements or a non-pristine graphene material having 0.01% to 50% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

The present invention also provides an electronic device containing the presently invented electrochemical battery cell as a power source. The electronic device may contain a sensor, a wireless device, a wearable device, or a medical device electronically connected to the invented electrochemical battery cell.

DESCRIPTION OF THE PREFERRED EMBODIMENTS

Figure 1A:
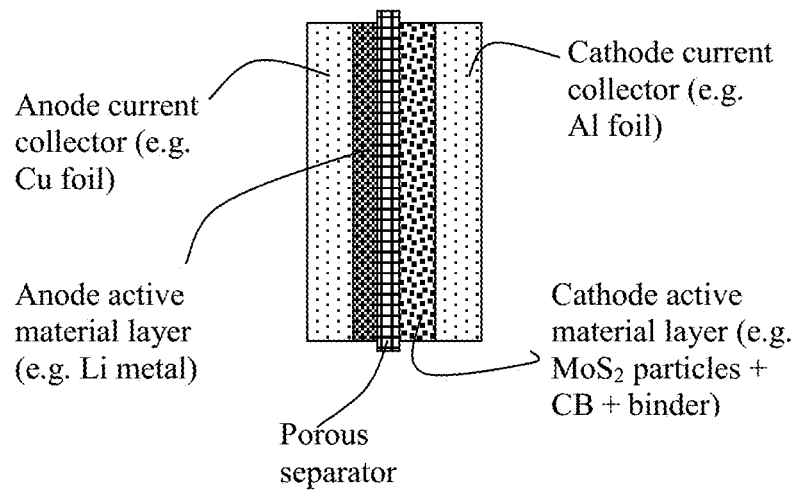
FIG. 1(A) schematic of a prior art lithium metal battery cell (e.g. a primary cell), composed of an anode current collector (e.g. Cu foil), a sheet of Li metal foil as the anode layer (Li metal being the anode active material), a porous separator, a cathode active material layer composed of particles of a cathode active material (e.g. $MoS_2$ or $MnO_2$) mixed with a conductive filler (e.g. acetylene black) and a resin binder (e.g. PVDF), and a cathode current collector (e.g. Al foil)

In a conventional primary cell configuration, as illustrated in FIG. 1(A), the cell is typically composed of an anode current collector (e.g. Cu foil), a sheet of Li metal foil as the anode layer (Li metal being the anode active material), a porous separator, a cathode active material layer composed of particles of a cathode active material (e.g. MoS$_2$ or MnO$_2$) mixed with a conductive filler (e.g. acetylene black) and a resin binder (e.g. PVDF), and a cathode current collector (e.g. Al foil). The anode active material (e.g. Li metal) can be in a thin film form deposited directly onto the anode current collector, such as a sheet of copper foil.

However, such a lithium metal battery cell is normally designed to deliver a high output voltage (e.g.>2.0 volts and more typically>3.0 volts) since essentially all the current electronic devices, power tools, electric vehicles, etc. operate at a cell voltage higher than 1.0 volts. Other types of batteries, primary or secondary, are also typically designed and built to provide an output voltage significantly higher than 1.0 volt; e.g. lithium-ion (3.7 V), lead acid (2 V), alkaline (1.5 V), zinc-air (1.4 V), and nickel-metal hydride (1.2 V). A device operating at a higher voltage than 4.0 volts requires the use of multiple cells connected in series (e.g. an electric bike operating on 12 volts requires 6 lead acid battery cells connected in series).

Figure 1B:
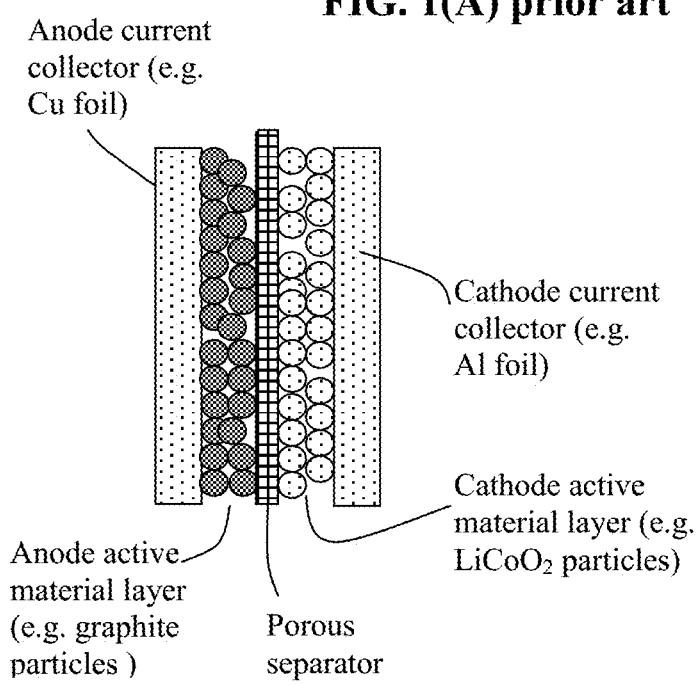
FIG. 1(B) schematic of a prior art lithium-ion battery cell (a secondary or rechargeable cell), composed of an anode current collector (e.g. Cu foil), an anode layer composed of particles of an anode active material (e.g. graphite or Si particles) mixed with a conductive filler (e.g. carbon black) and a resin binder (e.g. SBR), a porous separator, a cathode active material layer composed of particles of a cathode active material (e.g. $LiCoO_2$ or $LiFePO_4$) mixed with a conductive filler and a resin binder (e.g. PVDF), and a cathode current collector (e.g. Al foil).

As illustrated in FIG. 1(B), a lithium-ion battery cell (a secondary or rechargeable cell) is typically composed of an anode current collector (e.g. Cu foil), an anode or negative electrode, a porous separator and/or an electrolyte component, a cathode electrode (typically containing a cathode active material, a conductive additive, and a resin binder), and a cathode current collector (e.g. Al foil). In a more commonly used cell configuration, the anode layer is composed of particles of an anode active material (e.g. graphite, Sn, SnO$_2$, or Si), a conductive additive (e.g. carbon black particles), and a resin binder (e.g. SBR or PVDF).

Cu foil in the anode and Al foil in the cathode are each attached (welded or soldered) with a terminal tab for connection to an external circuit. However, these current collectors add weight and volume to the cell, reducing the effective gravimetric and volumetric energy densities of the cell.

The ultra low-power monitoring sensors require the availability of low-voltage power sources operating at a voltage level in the range of 0.3-0.8 V. This voltage level preferably remains relatively constant over a long operating period of time. Further, most of the wireless, wearable, or implanted devices require the power source to be as small in sizes as possible. Prior art batteries, either primary or secondary, do not meet these requirements.

These issues are herein addressed by the instant invention. One embodiment of the instant invention is an electrochemical battery cell that meets the aforementioned requirements.

The battery cell comprises: (A) an anode having a primary anode active material; (B) a cathode having a primary cathode active material, and (C) an ion-conducting electrolyte in ionic contact with the anode and the cathode, wherein the cell has an initial output voltage, Vi, measured at 10% depth of discharge (DoD), from a lower limit of 0.3 volts to an upper limit of 0.8 volts, and a final output voltage Vf measured at a DoD no greater than 90%, wherein a voltage variation, (Vi−Vf)/Vi, is no greater than ±15% (preferably no greater than ±10% and further preferably no greater than ±5%) and the specific capacity between Vi and Vf is no less than 100 mAh/g or 200 mAh/cm$^3$ based on the cathode active material weight or volume, and wherein the anode contains lithium (Li), sodium (Na), potassium (K), magnesium (Mg), aluminum (Al), zinc (Zn), titanium (Ti), manganese (Mn), iron (Fe), vanadium (V), cobalt (Co), nickel (Ni), a mixture thereof, an alloy thereof, or a combination thereof as the primary anode active material. The preferred anode active materials are Li, Na, Mg, Al and their alloys.

Figure 3:
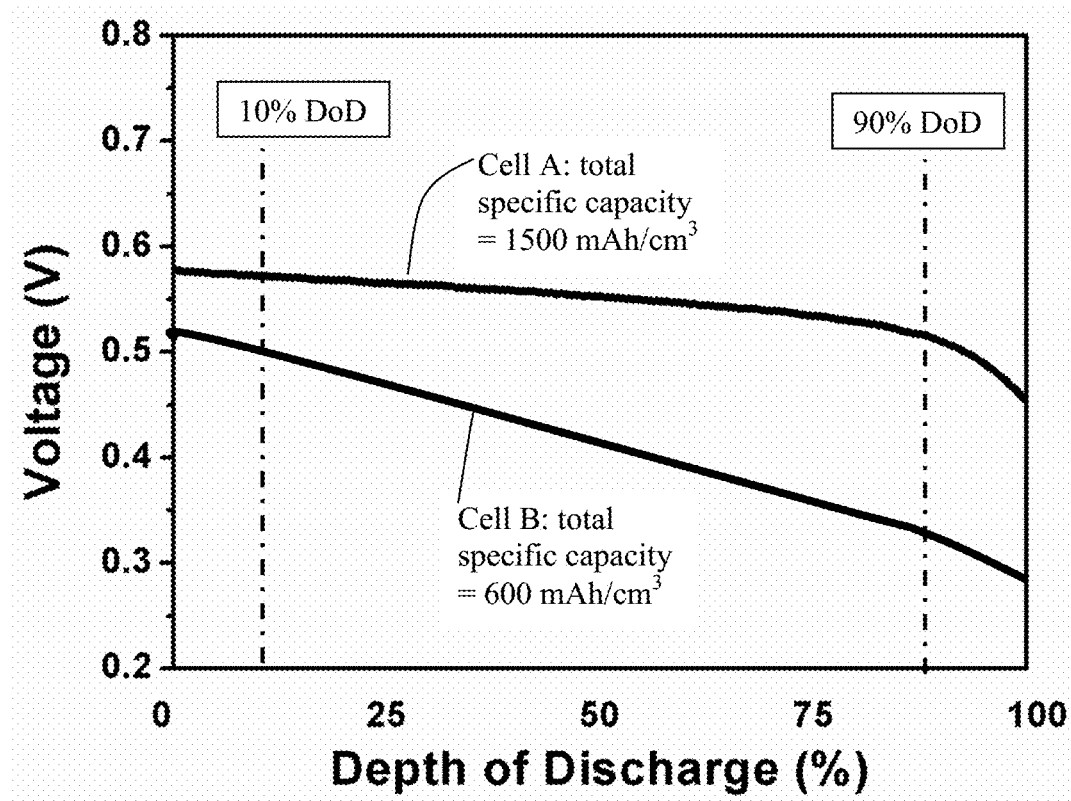
FIG. 3 Illustrative examples showing the discharge curves (voltage vs. DoD curves, or voltage vs. time at a constant current density) of two hypothetical battery cells: Cell A has a total specific capacity of 1,500 mAh/cm$^3$ (from 0% DoD to 100% DoD) and Cell B has a specific capacity of 600 mAh/cm$^3$.

The depth of discharge (DoD) is the ratio of the actual discharge amount (specific capacity, mAh/g or mAh/cm$^3$) to the maximum discharge amount that a battery cell can provide in terms of the cell weight, the anode active material weight, or the cathode active material weight. FIG. 3 provides illustrative examples showing the discharge curves (voltage vs. DoD curves, or voltage vs. time curves at a constant current density) of two cells: Cell A has a total specific capacity of 1,500 mAh/cm$^3$ (from 0% DoD to 100% DoD) and Cell B has a specific capacity of 600 mAh/cm$^3$.

For Cell A in FIG. 3, the 10% DoD occurs at 150 mAh/cm$^3$ and 90% DoD at 1,350 mAh/cm$^3$. The most useful DoD range, from 10% to 90%, corresponds to a specific capacity of 1,200 mAh/cm$^3$. With an average voltage of 0.55 volts, this range delivers an energy density of 1,200× 0.55=660 Wh/cm$^3$ (based on the cathode volume), which is acceptable, albeit not exceptional, for use in a lower power device. Further, from 10% to 90% DoD, the voltage drops from 0.575 volts to 0.545 volts, a variation of (0.575−0.545)/ 0.575=5.2%.

For Cell B, the 10% DoD occurs at 60 mAh/cm$^3$ and 90% DoD at 540 mAh/cm$^3$. This range corresponds to a specific capacity of 480 mAh/cm$^3$. However, over this range, the voltage drops from 0.50 to 0.33 volts, a variation of (0.50− 0.33)/0.50=34%, which is not acceptable. The electronic device normally requires a relatively stable voltage over the useful lifetime. It is reasonable to assume that a variation of ±10% is acceptable; then, the voltage cannot be allowed to drop from 0.50 to below 0.45 volts over a desired range of DoD. For Cell B, this 0.45 volts corresponds to a DoD of 35%. Consequently, the useful voltage range is from 10% to 35% DoD, corresponding to a useful specific capacity of (35%−10%)×600=150 mAh/cm$^3$, which is too low for any practical use as a long-life primary cell.

Thus, in summary, when measured at 10% depth of discharge (DoD), the battery cell must deliver an initial output voltage Vi from 0.3 volts to 0.8 volts, preferably from 0.3 volts to 0.7 volts. The battery cell also delivers a final output voltage Vf measured at a DoD no greater than 90% and the specific capacity between Vi and Vf is preferably no less than 100 mAh/g or 200 mAh/cm$^3$ based on the cathode active material weight or volume. Preferably, the voltage variation, (Vi−Vf)/Vi, is no greater than ±10% (more preferably no greater than ±5%) between Vi and the selected Vf. A battery designer or electronic device designer is free to select a Vf at a DoD from 10% to 90%, but the specific capacity delivered by the battery cell between Vi and Vf is preferably no less than 200 mAh/g or 400 mAh/cm$^3$ based on the cathode active material weight or volume (further preferably no less than 300 mAh/g or 600 mAh/cm$^3$, more preferably no less than 400 mAh/g or 800 mAh/cm$^3$, even more preferably no less than 500 mAh/g or 1,000 mAh/cm$^3$, still further preferably no less than 700 mAh/g or 1,400 mAh/cm$^3$, and most preferably no less than 1,000 mAh/g or 2,000 mAh/cm$^3$).

The primary cathode active material may be selected from a metal, semi-metal, or non-metal element different than the primary anode active material and the metal, semi-metal, or non-metal element in the cathode is selected from tin (Sn), bismuth (Bi), antimony (Sb), indium (In), tellurium (Te), phosphor (P), magnesium (Mg), aluminum (Al), zinc (Zn), titanium (Ti), manganese (Mn), iron (Fe), vanadium (V), cobalt (Co), nickel (Ni), selenium (Se), sulfur (S), a mixture thereof, an alloy thereof, or a combination thereof. The metal, semi-metal, or non-metal used as the primary cathode active material must be different than the metal used as the primary anode active material and, when coupled with the primary anode active material, must deliver an output voltage in the range of 0.3 volts to 0.8 volts.

The primary cathode active material may also be selected from a metal oxide, metal phosphate, or metal sulfide; in particular, it may be selected from a tin oxide, cobalt oxide, nickel oxide, manganese oxide, vanadium oxide, iron phosphate, manganese phosphate, vanadium phosphate, transition metal sulfide, or a combination thereof.

In certain embodiments, the primary cathode active material contains an inorganic material selected from carbon sulfur, sulfur compound, lithium polysulfide, transition metal dichalcogenide, a transition metal trichalcogenide, or a combination thereof.

The electrochemical battery cell may further comprise an anode current collector supporting the anode and/or a cathode current collector supporting the cathode.

Preferably, the anode and/or cathode further contain graphene as a protective material to protect the primary anode/cathode active material. Further preferably, the primary anode active material and/or cathode active material are embraced by graphene sheets or embedded in a graphene film, graphene paper, graphene mat, or graphene foam.

The graphene material for use in the anode and/or the cathode may contain a pristine graphene material having less than 0.01% by weight of non-carbon elements or a non-pristine graphene material having 0.01% to 50% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

In the presently invented battery cell, the graphene film, graphene paper, graphene mat, or graphene foam (having the primary anode active material embedded therein) in the anode is connected to a first battery terminal tab (i.e. the graphene film, paper, mat, or foam itself serving as an anode current collector) and there is no separate or additional anode current collector (e.g. Cu foil) to support the graphene film, graphene paper, graphene mat, or graphene foam. This feature can significantly reduce the battery weight and volume and, as such, significantly increase the gravimetric and volumetric energy density.

In certain embodiments, the graphene film, graphene paper, graphene mat, or graphene foam in the cathode having the primary cathode active material embedded therein is connected to a battery terminal tab (the graphene film, graphene paper, graphene mat, or graphene foam itself acting as a cathode current collector) and there is no separate or additional cathode current collector to support the graphene film, graphene paper, graphene mat, or graphene foam.

Most preferably, both the anode and the cathode sides do not have a separate (additional) current collector. Specifically, the graphene film, graphene paper, graphene mat, or graphene foam in the anode (having a first terminal tab connected thereto) serves as the anode current collector (no additional or separate anode current collector such as Cu foil) and the graphene film, graphene paper, graphene mat, or graphene foam in the cathode (having a second battery terminal tab connected thereto) serves as the cathode current collector and there is no separate or additional cathode current collector (such as Al foil) to support said graphene film, graphene paper, graphene mat, or graphene foam in the cathode. This feature can significantly reduce the battery weight and volume and, as such, further significantly increase the gravimetric and volumetric energy density.

Furthermore, the flexibility of the graphene film, graphene paper, graphene mat, or graphene foam in both the anode and the cathode and the lack of Cu foil and Al foil current collectors also enables the production of flexible battery cell for use in a wireless, wearable, or implanted device that can be of an odd shape. These unexpected features are highly desirable for wireless, wearable, or implanted devices.

Another unexpected feature of instant invention is the notion that graphene is capable of modifying the electrochemical properties of an anode or a cathode active material (e.g. changing the discharge curve). Thus, in certain embodiments, the cathode further contains graphene as an electrochemical property modifier to the primary cathode active material wherein the added graphene increases the cell specific capacity, or increases or decreases a cell output voltage (relative to a corresponding cell without the added graphene in the cathode). Preferably, the primary cathode active material is bonded to or physically supported by a surface of graphene. Again, the graphene, as an electrochemical modifier, may contain a pristine graphene material having less than 0.01% by weight of non-carbon elements or a non-pristine graphene material having 0.01% to 50% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene or graphene oxide sheets/platelets (collectively, NGPs) are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

Figure 2:
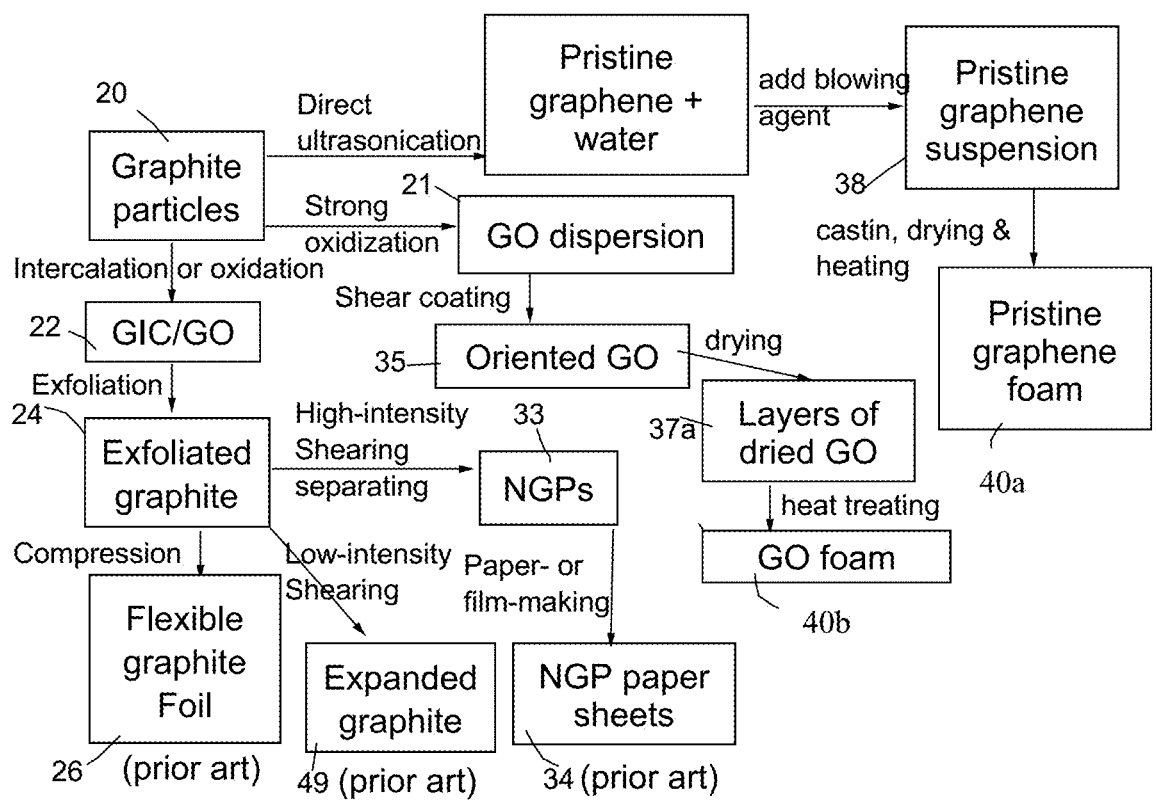
FIG. 2 A flow chart illustrating various prior art processes of producing exfoliated graphite products (flexible graphite foils and expanded graphite flakes), along with a process for producing pristine graphene foam 40a or graphene oxide foams 40b.

In one process, graphene materials are obtained by intercalating natural graphite particles with a strong acid and/or an oxidizing agent to obtain a graphite intercalation compound (GIC) or graphite oxide (GO), as illustrated in FIG. 2 (a process flow chart). The presence of chemical species or functional groups in the interstitial spaces between graphene planes serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (20 in FIG. 2) in a mixture of sulfuric acid, nitric acid (an oxidizing agent), and another oxidizing agent (e.g. potassium permanganate or sodium perchlorate). The resulting GIC (22) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (24), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (26) that typically have a thickness in the range of 0.1 mm (100 μm)–0.5 mm (500 μm). Alternatively, one may choose to use a low-intensity air mill or shearing machine to simply break up the graphite worms for the purpose of producing the so-called "expanded graphite flakes" (49) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33), as disclosed in our U.S. application Ser. No. 10/858,814. Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper (34) using a paper-making process.

Route 2 entails ultrasonicating the graphite oxide suspension for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

All types of graphene sheets (along with particles of an anode or cathode active material) may be made into a paper form; e.g. using a vacuum-assisted filtration procedure. All types of graphene sheets (along with particles of an anode or cathode active material) may be made into a film form using a coating or casting procedure. These procedures are well-known in the art.

A graphene foam may be prepared by using a procedure that includes a blowing agent. A blowing agent or foaming agent is a substance which is capable of producing a cellular or foamed structure via a foaming process in a variety of materials that undergo hardening or phase transition, such as polymers (plastics and rubbers), glass, and metals. They are typically applied when the material being foamed is in a liquid state. It has not been previously known that a blowing agent can be used to create a foamed material while in a solid state. More significantly, it has not been previously taught or hinted that an aggregate of graphene sheets can be converted into a graphene foam via a blowing agent. The cellular structure in a polymer matrix is typically created for the purpose of reducing density, increasing thermal resistance and acoustic insulation, while increasing the thickness and relative stiffness of the original polymer.

Blowing agents or related foaming mechanisms to create pores or cells (bubbles) in a matrix for producing a foamed or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

(e) Soluble and leachable agents: Soluble fillers, e.g. solid sodium chloride crystals mixed into a liquid urethane system, which is then shaped into a solid polymer part, the sodium chloride is later washed out by immersing the solid molded part in water for some time, to leave small interconnected holes in relatively high density polymer products.

(f) We have found that the above five mechanisms can all be used to create pores in the graphene materials while they are in a solid state. Another mechanism of producing pores in a graphene material is through the generation and vaporization of volatile gases by removing those non-carbon elements in a high-temperature environment. This is a unique self-foaming process that has never been previously taught or suggested.

In a preferred embodiment, the graphene material in the dispersion is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

For instance, the graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce GO sheets.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension. A chemical blowing agent may then be dispersed into the dispersion (38 in FIG. 2). This suspension is then cast or coated onto the surface of a solid substrate (e.g. glass sheet or Al foil). When heated to a desired temperature, the chemical blowing agent is activated or decomposed to generate volatile gases (e.g. $N_2$ or $CO_2$), which act to form bubbles or pores in an otherwise mass of solid graphene sheets, forming a pristine graphene foam 40*a*.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The pore walls (cell walls or solid graphene portion) in the graphene foam of the presently invented anode contain chemically bonded and merged graphene planes. These planar aromatic molecules or graphene planes (hexagonal structured carbon atoms) are well interconnected physically and chemically. The lateral dimensions (length or width) of these planes are huge (e.g. from 20 nm to >10 μm), typically several times or even orders of magnitude larger than the maximum crystallite dimension (or maximum constituent graphene plane dimension) of the starting graphite particles. The graphene sheets or planes are essentially merged and/or interconnected to form electron-conducting pathways with low resistance. This is a unique and new class of material that has not been previously discovered, developed, or suggested to possibly exist.

In order to illustrate how the presently invented process works to produce a layer of graphene foam-protected anode or cathode material, we herein make use of graphene oxide (GO) and graphene fluoride (GF) as two examples. These should not be construed as limiting the scope of our claims. In each case, the first step involves preparation of a graphene dispersion (e.g. GO+water or GF+organic solvent, DMF) containing an optional blowing agent. If the graphene material is pristine graphene containing no non-carbon elements, a blowing agent is required.

In step (b), the GF or GO suspension (21 in FIG. 2), but now also containing particles of an anode or cathode active material is formed into a wet GF or GO layer 35 on a solid substrate surface (e.g. PET film or glass) preferably under the influence of a shear stress. One example of such a shearing procedure is casting or coating a thin film of GF or GO suspension using a coating machine. This procedure is similar to a layer of varnish, paint, coating, or ink being coated onto a solid substrate. The roller or wiper creates a shear stress when the film is shaped, or when there is a high relative motion between the roller/blade/wiper and the supporting substrate. Quite unexpectedly and significantly, such a shearing action enables the planar GF or GO sheets to well align along, for instance, a shearing direction. Further surprisingly, such a molecular alignment state or preferred orientation is not disrupted when the liquid components in the GF or GO suspension are subsequently removed to form a well-packed layer of highly aligned GF or GO sheets that are at least partially dried. The dried GF or GO mass 37*a* has a high birefringence coefficient between an in-plane direction and the normal-to-plane direction.

In an embodiment, this GF or GO layer, each containing Si particles therein, is then subjected to a heat treatment to activate the blowing agent and/or the thermally-induced reactions that remove the non-carbon elements (e.g. F, O, etc.) from the graphene sheets to generate volatile gases as by-products. These volatile gases generate pores or bubbles inside the solid graphene material, pushing solid graphene sheets into a foam wall structure, forming a graphene oxide foam (40*b* in FIG. 2). If no blowing agent is added, the non-carbon elements in the graphene material preferably occupy at least 10% by weight of the graphene material (preferably at least 20%, and further preferably at least 30%). The first (initial) heat treatment temperature is typically greater than 80° C., preferably greater than 100° C., more preferably greater than 300° C., further more preferably greater than 500° C. and can be as high as 1,500° C. The blowing agent is typically activated at a temperature from 80° C. to 300° C., but can be higher. The foaming procedure (formation of pores, cells, or bubbles) is typically completed within the temperature range of 80-1,500° C. Quite surprisingly, the chemical linking or merging between graphene planes (GO or GF planes) in an edge-to-edge and face-to-face manner can occur at a relatively low heat treatment temperature (e.g. even as low as from 150 to 300° C.).

The foamed graphene material may be subjected to a further heat treatment that involves at least a second temperature that is significantly higher than the first heat treatment temperature.

A properly programmed heat treatment procedure can involve just a single heat treatment temperature (e.g. a first heat treatment temperature only), at least two heat treatment temperatures (first temperature for a period of time and then raised to a second temperature and maintained at this second temperature for another period of time), or any other combination of heat treatment temperatures (HTT) that involve an initial treatment temperature (first temperature) and a final HTT (second), higher than the first. The highest or final HTT that the dried graphene layer experiences may be divided into three distinct HTT regimes:

Regime 1 (80° C. to 300° C.): In this temperature range (the thermal reduction regime and also the activation regime for a blowing agent, if present), a GO or GF layer primarily undergoes thermally-induced reduction reactions, leading to a reduction of oxygen content or fluorine content from typically 20-50% (of O in GO) or 10-25% (of F in GF) to approximately 5-6%. This treatment results in a reduction of inter-graphene spacing in foam walls from approximately 0.6-1.2 nm (as dried) down to approximately 0.4 nm, and an increase in thermal conductivity to 200 W/mK per unit specific gravity and/or electrical conductivity to 2,000 S/cm per unit of specific gravity. (Since one can vary the level of porosity and, hence, specific gravity of a graphene foam material and, given the same graphene material, both the thermal conductivity and electric conductivity values vary with the specific gravity, these property values must be divided by the specific gravity to facilitate a fair comparison.) Even with such a low temperature range, some chemical linking between graphene sheets occurs. The inter-GO or inter-GF planar spacing remains relatively large (0.4 nm or larger). Many O- or F-containing functional groups survive.

Regime 2 (300° C.-1,500° C.): An important event occurs in this temperature range: The event relates to the formation of the graphene foam structure. In this chemical linking regime, extensive chemical combination, polymerization, and cross-linking between adjacent GO or GF sheets occur. The oxygen or fluorine content is reduced to typically<1.0% (e.g. 0.7%) after chemical linking, resulting in a reduction of inter-graphene spacing to approximately 0.345 nm. This implies that some initial re-graphitization has already begun at such a low temperature, in stark contrast to conventional graphitizable materials (such as carbonized polyimide film) that typically require a temperature as high as 2,500° C. to initiate graphitization. This is another distinct feature of the presently invented graphene foam and its production processes. These chemical linking reactions result in an increase in thermal conductivity to 250 W/mK per unit of specific gravity, and/or electrical conductivity to 2,500-4,000 S/cm per unit of specific gravity.

Regime 3 (1,500-2,500° C.): In this ordering and re-graphitization regime, extensive graphitization or graphene plane merging occurs, leading to significantly improved degree of structural ordering in the foam walls. As a result, the oxygen or fluorine content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in thermal conductivity to >350 W/mK per unit of specific gravity, and/or electrical conductivity to >3,500 S/cm per unit of specific gravity.

Regime 4 (>2,500° C.): Re-graphitization or re-crystallization.

The presently invented graphene foam structure containing an anode or cathode active material therein can be obtained by heat-treating the dried GO or GF layer with a temperature program that covers at least the first regime (typically requiring 1-4 hours in this temperature range if the temperature never exceeds 500° C.), more commonly covers the first two regimes (1-2 hours preferred), still more commonly the first three regimes (preferably 0.5-2.0 hours in Regime 3), and can cover all the 4 regimes (including Regime 4 for 0.2 to 1 hour, may be implemented to achieve the highest conductivity).

If the graphene material is selected from the group of non-pristine graphene materials consisting of graphene oxide, reduced graphene oxide, graphene fluoride, graphene chloride, graphene bromide, graphene iodide, hydrogenated graphene, nitrogenated graphene, chemically functionalized graphene, or a combination thereof, and wherein the maximum heat treatment temperature (e.g. both the first and second heat treatment temperatures) is (are) less than 2,500° C., then the resulting solid graphene foam typically contains a content of non-carbon elements in the range of 0.01% to 2.0% by weight (non-pristine graphene foam).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The graphene foam walls having a $d_{002}$ higher than 0.3440 nm reflects the presence of oxygen- or fluorine-containing functional groups (such as —F, —OH, —O, and —COOH on graphene molecular plane surfaces or edges) that act as a spacer to increase the inter-graphene spacing.

Another structural index that can be used to characterize the degree of ordering of the stacked and bonded graphene planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

Figure 4:
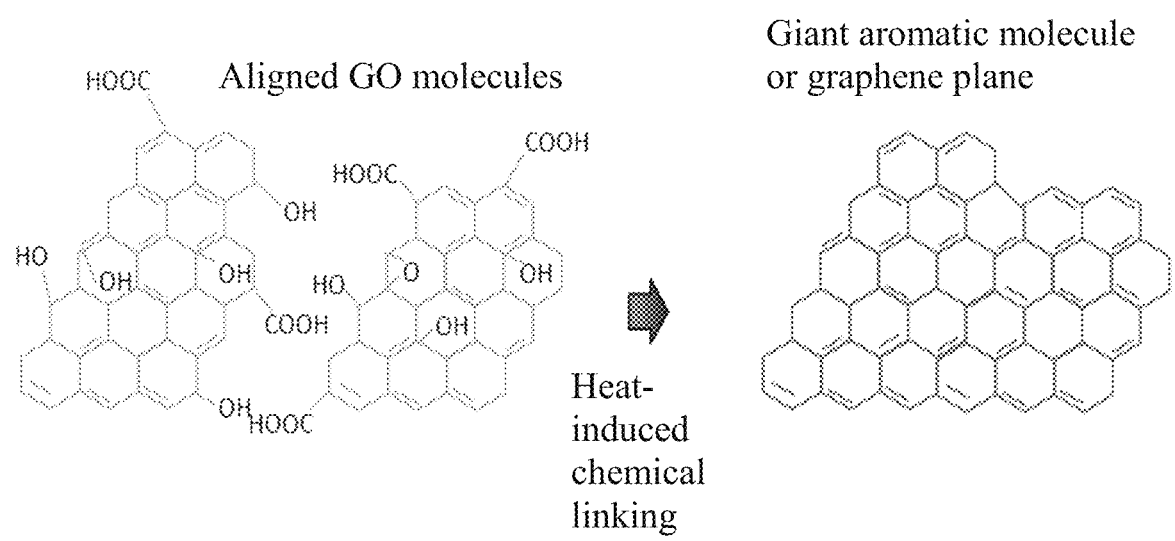
FIG. 4 A possible graphene sheet-to-sheet merging mechanism.

Illustrated in FIG. 4 is a plausible chemical linking mechanism where only 2 aligned GO molecules are shown as an example, although a large number of GO molecules can be chemically linked together to form a foam wall. Further, chemical linking could also occur face-to-face, not just edge-to-edge for GO, GF, and chemically functionalized graphene sheets. These linking and merging reactions proceed in such a manner that the molecules are chemically merged, linked, and integrated into one single entity. The graphene sheets (GO or GF sheets) completely lose their own original identity and they no longer are discrete sheets/platelets/flakes. The resulting product is not a simple aggregate of individual graphene sheets, but a single entity that is essentially a network of interconnected giant molecules with an essentially infinite molecular weight. This may also be described as a graphene poly-crystal (with several grains, but typically no discernible, well-defined grain boundaries). All the constituent graphene planes are very large in lateral dimensions (length and width) and, if the HTT is sufficiently high (e.g.>1,500° C. or much higher), these graphene planes are essentially bonded together with one another. The graphene foam of the presently invented anode layer or cathode layer has the following unique and novel features that have never been previously taught or hinted. These features make these electrode layers (having active materials embedded therein) function as current collectors as well, obviating the need to have a separate current collector in the anode or cathode:

(1) In-depth studies using a combination of SEM, TEM, selected area diffraction, X-ray diffraction, AFM, Raman spectroscopy, and FTIR indicate that the graphene foam walls are composed of several huge graphene planes (with length/width typically>>20 nm, more typically>>100 nm, often>>1 µm, and, in many cases, >>10 µm, or even >>100 µm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphene planes.

(2) These interconnected large graphene planes in the graphene foam walls form an integral 3D network of graphene that is not only highly conducting but also elastic, enabling the foam pores to expand and shrink reversibly and in congruent with anode active material particles lodged in the pores without inducing significant anode electrode expansion or shrinkage in the battery.

(3) This graphene foam wall is not made by gluing or bonding discrete flakes/platelets together with a resin binder, linker, or adhesive. Instead, GO sheets (molecules) from the GO dispersion or the GF sheets from the GF dispersion are merged through joining or forming of covalent bonds with one another, into an integrated graphene entity, without using any externally added linker or binder molecules or polymers. For a lithium battery featuring such an anode layer, there is no need to have non-active materials, such as a resin binder or a conductive additive, which are incapable of storing lithium. This implies a reduced amount of non-active materials or increased amount of active materials in the anode, effectively increasing the specific capacity per total anode weight, mAh/g (of composite).

(4) The graphene foam pore walls are typically a poly-crystal composed of large graphene grains having incomplete or poorly defined grain boundaries. This entity is derived from a GO or GF suspension, which is in turn obtained from natural graphite or artificial graphite particles originally having multiple graphite crystallites. Prior to being chemically oxidized or fluorinated, these starting graphite crystallites have an initial length ($L_a$ in the crystallographic a-axis direction), initial width ($L_b$ in the b-axis direction), and thickness ($L_c$ in the c-axis direction). Upon oxidation or fluorination, these initially discrete graphite particles are chemically transformed into highly aromatic graphene oxide or graphene fluoride molecules having a significant concentration of edge- or surface-borne functional groups (e.g. —F, —OH, —COOH, etc.). These aromatic GO or GF molecules in the suspension have lost their original identity of being part of a graphite particle or flake. Upon removal of the liquid component from the suspension, the resulting GO or GF molecules form an essentially amorphous structure. Upon heat treatments, these GO or GF molecules are chemically merged and linked into a unitary or monolithic graphene entity that constitutes the foam wall. This foam wall is highly ordered.

The resulting unitary graphene entity in the foam wall typically has a length or width significantly greater than the $L_a$ and $L_b$ of the original crystallites. The length/width of this graphene foam wall entity is significantly greater than the $L_a$ and $L_b$ of the original crystallites. Even the individual grains in a poly-crystalline graphene wall structure have a length or width significantly greater than the $L_a$ and $L_b$ of the original crystallites.

(5) The large length and width of the graphene planes enable the foam walls to be of high mechanical strength and elasticity. In comparative experiments, we observe that without this feature (i.e. no chemical merging of graphene planes), conventionally made graphene foams composed of aggregates of discrete graphene sheets, are relatively weak, fragile, and non-elastic (deformation not reversible).

(6) Due to these unique chemical composition (including oxygen or fluorine content), morphology, crystal structure (including inter-graphene spacing), and structural features (e.g. high degree of orientations, few defects, incomplete grain boundaries, chemical bonding and no gap between graphene sheets, and substantially no interruptions in graphene planes), the GO- or GF-derived graphene foam has a unique combination of outstanding thermal conductivity, electrical conductivity, mechanical strength, and stiffness (elastic modulus).

The following examples are used to illustrate some specific details about the best modes of practicing the instant invention and should not be construed as limiting the scope of the invention.

EXAMPLE 1

Evaluation of Various Battery Cells

For electrochemical testing, several types of anodes and cathodes were prepared. For instance, a layer-type of anode or cathode was prepared by simply roll-pressing the foam (including an anode or cathode active material embedded therein) against a sheet of Cu foil (as an anode current collector). Some foam samples containing an anode active material were used as an anode electrode without using a separate Cu foil current collector. Some foam samples containing a cathode active material were used as a cathode electrode without using a separate Al foil current collector.

For comparison purposes, slurry coating was also used to prepare conventional electrodes. For instance, the working electrodes were prepared by mixing 85 wt. % active material ($SnO_2$ particles, 7 wt. % acetylene black (Super-P), and 8 wt. % polyvinylidene fluoride (PVDF, 5 wt. % solid content) binder dissolved in N-methyl-2-pyrrolidinoe (NMP). After coating the slurries on Cu foil, the electrodes were dried at 120° C. in vacuum for 2 h to remove the solvent before pressing.

Then, the electrodes were cut into a disk ($\phi$=12 mm) and dried at 100° C. for 24 h in vacuum. Electrochemical measurements were carried out using CR2032 (3V) coin-type cells with lithium metal (as one example) as the counter/reference electrode, Celgard 2400 membrane as separator, and (as an example of electrolyte) 1 M $LiPF_6$ electrolyte solution dissolved in a mixture of ethylene carbonate (EC) and diethyl carbonate (DEC) (EC-DEC, 1:1 v/v). Various anode and cathode material compositions were evaluated. The cell assembly was performed in an argon-filled glove-box. The CV measurements were carried out using an electrochemical workstation at a scanning rate of 1-100 mV/s. The electrochemical performance of various cells was also evaluated by galvanostatic charge/discharge cycling at a current density of 50-1,000 mA/g, using a LAND electrochemical workstation. Full-cell pouch were also prepared and tested.

The following examples of low-voltage cells can be (and have been in our lab) connected to sensors, small actuators, small hearing aids (an example of small medical devices), small wireless circuits, wearable devices, etc.

EXAMPLE 2

Low-Voltage Al—S Cells (Aqueous or Organic Electrolytes)

Figure 5:
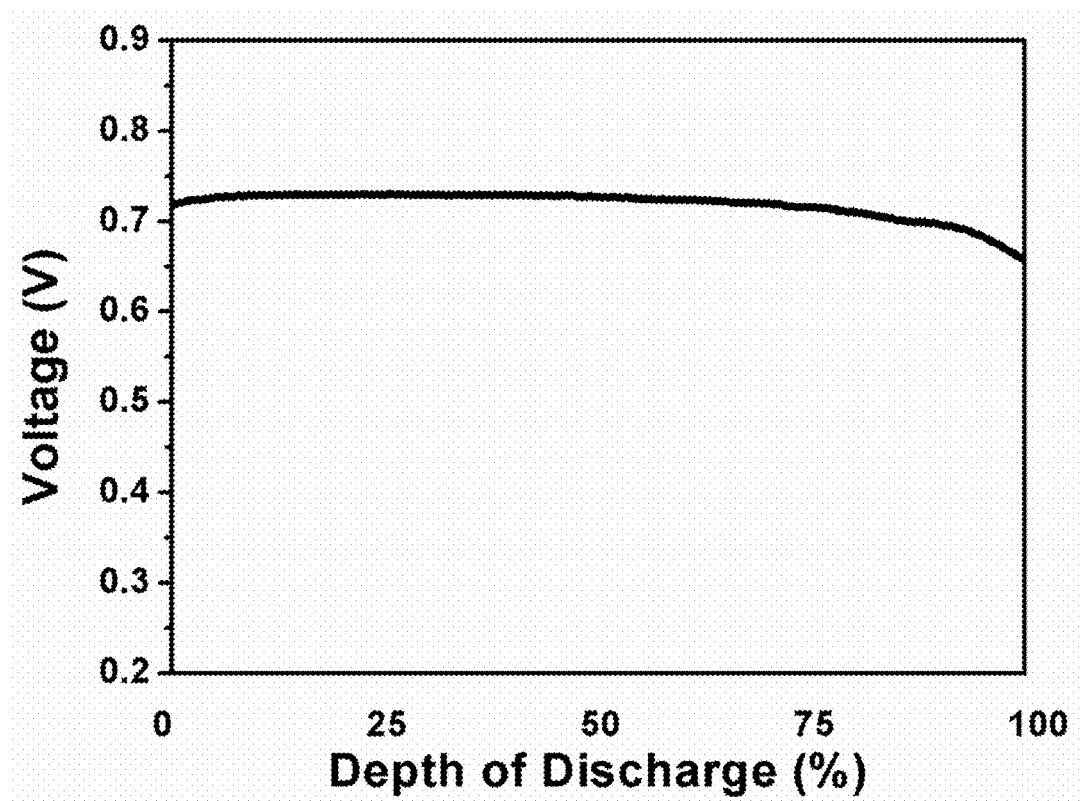
FIG. 5 The discharge curve (voltage vs. DoD) of a low-voltage Al-S cell.

From the electrochemical reaction perspective, sulfur (S) is a bivalent material that can accept/give two electrons during redox reactions. The actual capacity is around 1,980 mAh/cm³. If paired with an aluminum anode, the output voltage is found to be ~0.73 V (FIG. 5). The voltage variation between 10% DoD and 90% DoD is ±2.1%.

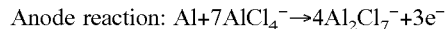
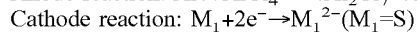
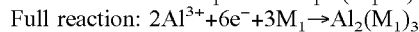

Anode reaction: $Al + 7AlCl_4^- \rightarrow 4Al_2Cl_7^- + 3e^-$
Cathode reaction: $M_1 + 2e^- \rightarrow M_1^{2-}$ ($M_1$=S)
Full reaction: $2Al^{3+} + 6e^- + 3M_1 \rightarrow Al_2(M_1)_3$

EXAMPLE 3

Figure 6:
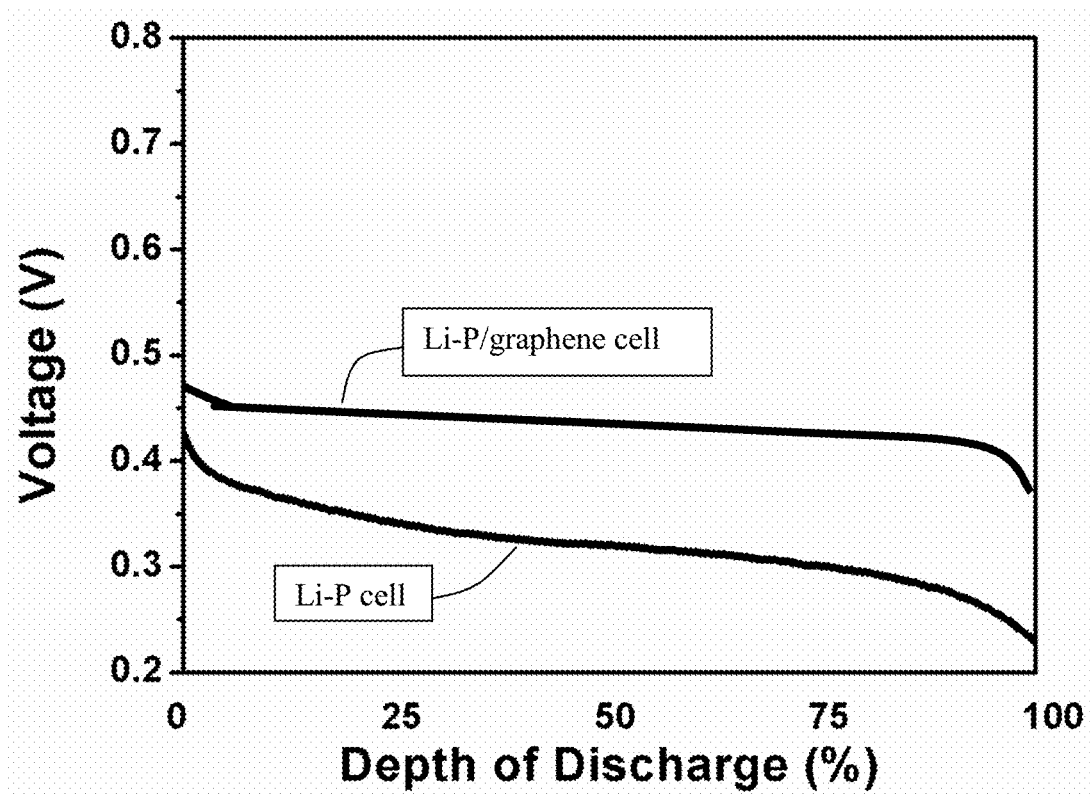
FIG. 6 The discharge curves (voltage vs. DoD) of a low-voltage Li-P cell and a graphene modified Li-P/graphene cell.

Low-Voltage Li—P Cells $M_2$ ($M_2$=P) is a trivalent material that can accept/give three electrons during redox reactions. The actual capacity is around 2,371 mAh/cm³ at 100% DoD (FIG. 6). When paired with a lithium anode, it gave the output voltage of ~0.32 V. The voltage variation between 10% DoD and 90% DoD is ±14%. With the presence of 20% by weight graphene in the cathode, the discharge curve is shifted upward by a full 0.1 volts and the slope is significantly decreased (more stable voltage output). These unexpected improvements are highly beneficial.

Anode reaction: Li→Li$^+$+e$^-$
Cathode reaction: M$_2$+3e$^-$→M$_2^{3-}$
Full reaction: 3Li$^+$+3e$^-$+M$_2$→Li$_3$(M$_2$)

EXAMPLE 4

Low-Voltage Li—SnO$_2$ Cells

Figure 7:
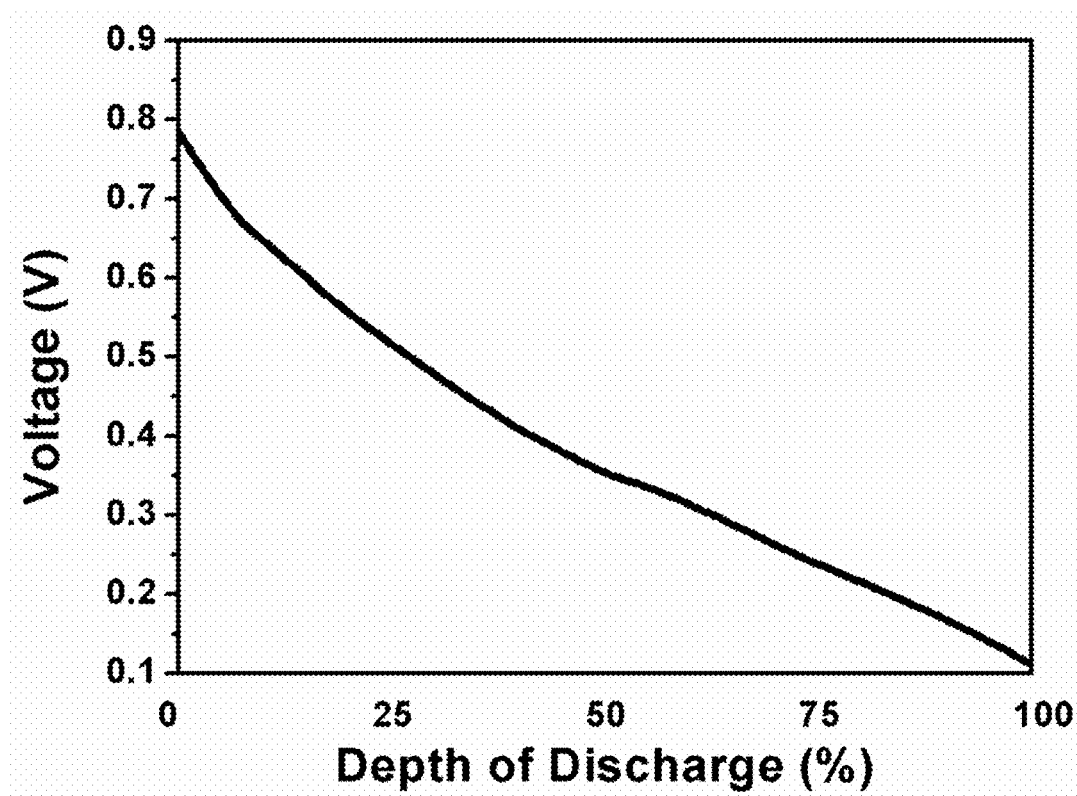
FIG. 7 The discharge curve (voltage vs. DoD) of a low-voltage Li—$SnO_2$ cell.

M$_4$ (compound A$_y$B$_z$=SnO$_2$) is a multivalent material that can accept/give multi electrons during redox reactions. The discharge curve consists of two regions, a level plateau and a slope curve (FIG. 7). The actual capacity of the slope curve is around 6,157 mAh/cm$^3$ at 100% DoD. When paired with a lithium anode and only the slope region is utilized, it gave the output voltage of ~0.35 V. The voltage variation between 10% DoD and 90% DoD is ±68%. However, one can identify a Vf wherein the voltage variation, (Vi−Vf)/Vi, is no greater than ±10% since the specific capacity is so large.

Anode reaction: Li→Li$^+$+e$^-$
Cathode reaction: A(M$_4$)+xe$^-$→A(M$_4$)$^{x-}$
Full reaction: xLi$^+$+xe$^-$+A(M$_4$)→Li$_x$(A(M$_4$))

EXAMPLE 5

Low-Voltage Na—SnO$_2$ Cells

Figure 8:
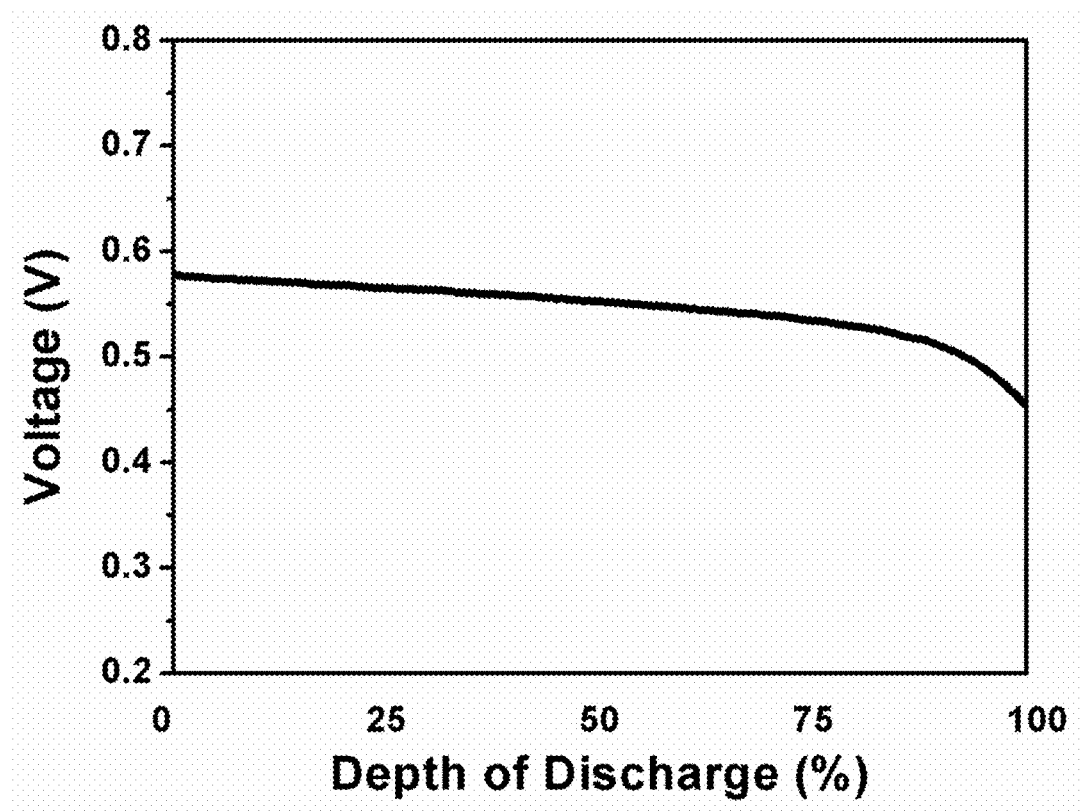
FIG. 8 The discharge curve (voltage vs. DoD) of a low-voltage Na—$SnO_2$ cell.

M$_4$ (compound A$_y$B$_z$=SnO$_2$) is a multivalent material that can accept/give multi electrons during redox reactions. The discharge curve consists of two regions, a level plateau and a slope curve (FIG. 8). The actual capacity is around 3,315 mAh/cm$^3$ at 100% DoD. When paired with a sodium anode and only the plateau region is utilized, it gave the output voltage of ~0.55 V. The voltage variation between 10% DoD and 90% DoD is ±5%.

Anode reaction: Na→Na$^+$+e$^-$
Cathode reaction: A$_y$B$_z$(M$_4$)+xe$^-$→yA(M$_4$)+zB(M$_4$)$^{(x/z)-}$
Full reaction: xNa$^+$+xe$^-$+A$_y$B$_z$(M$_4$)→yA(M$_4$)+zNa$_{(x/z)}$B(M$_4$)

EXAMPLE 6

Low-Voltage Li—Sb Cells

Figure 9:
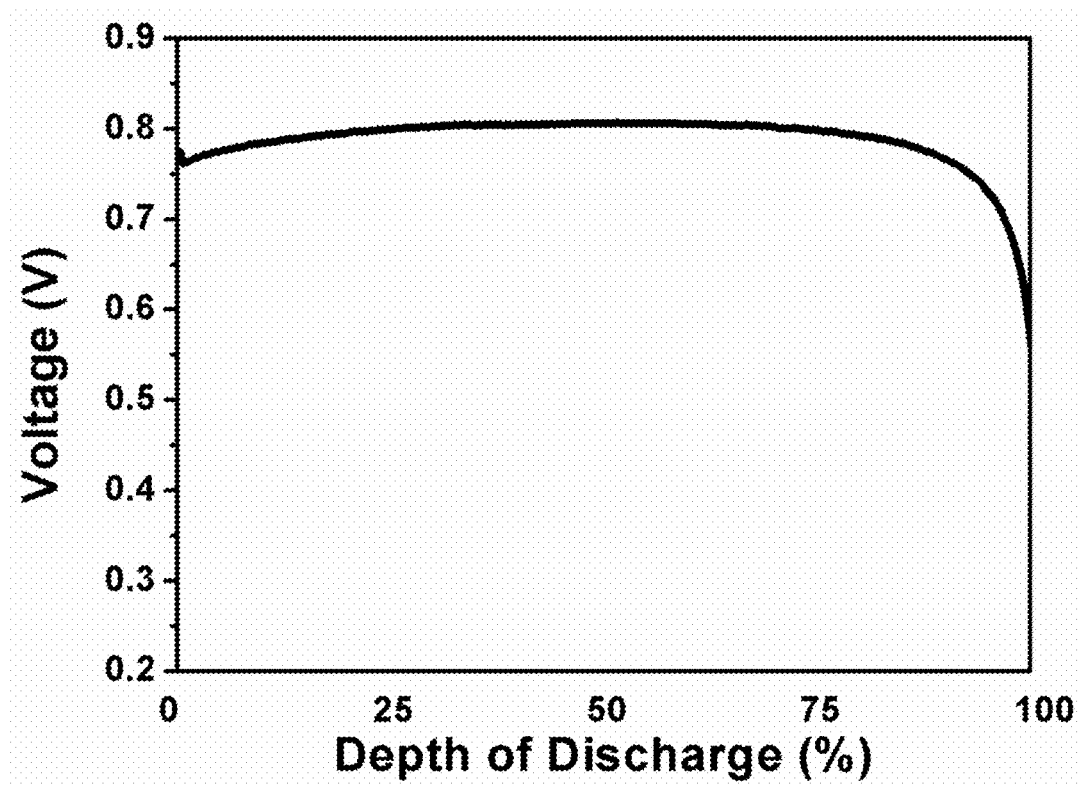
FIG. 9 The discharge curve (voltage vs. DoD) of a low-voltage Li—Sb cell.

M$_7$ (Sb) is a multivalent material that can accept/give multi electrons during redox reactions. The actual capacity is around 3,355 mAh/cm$^3$. When paired with a lithium anode, it gave the output voltage of ~0.80 V (FIG. 9). The voltage variation between 10% DoD and 90% DoD is ±2.4%.

Anode reaction: Li→Li$^+$+e$^-$
Cathode reaction: M$_7$+xe$^-$→M$_7^{x-}$
Full reaction: xLi$^+$+xe$^-$+M$_7$→Li$_x$(M$_7$)

EXAMPLE 7

Low-Voltage Na—Sb Cells

Figure 10:
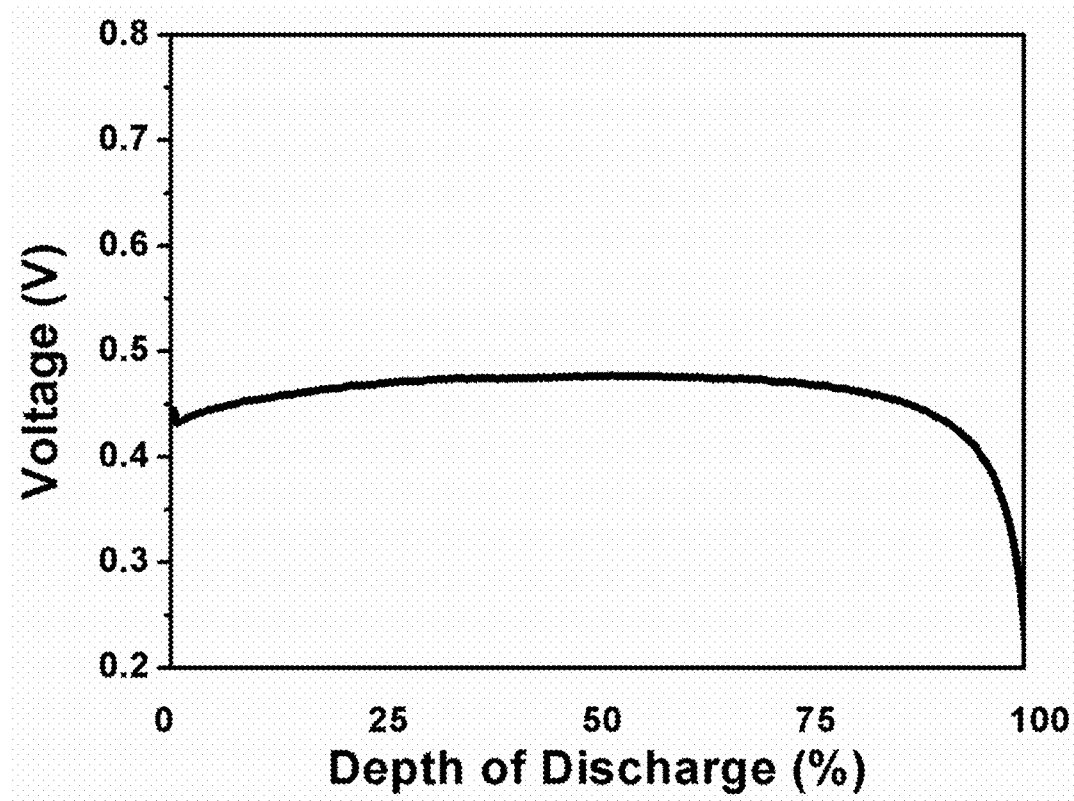
FIG. 10 The discharge curve (voltage vs. DoD) of a low-voltage Na—Sb cell.

M$_7$ (Sb) is a multivalent material that can accept/give multi electrons during redox reactions. The actual capacity is around 3,355 mAh/cm$^3$. When paired with a sodium anode, it gave the output voltage of ~0.47 V (FIG. 10). The voltage variation between 10% DoD and 90% DoD is ±2.4%.

Anode reaction: Na→Na$^+$+e$^-$
Cathode reaction: M$_7$+xe$^-$→M$_7^{x-}$
Full reaction: xNa$^+$+xe$^-$+M$_7$→Na$_x$(M$_7$)

EXAMPLE 8

Low-Voltage Li—Fe$_3$O$_4$ Cells

Figure 11:
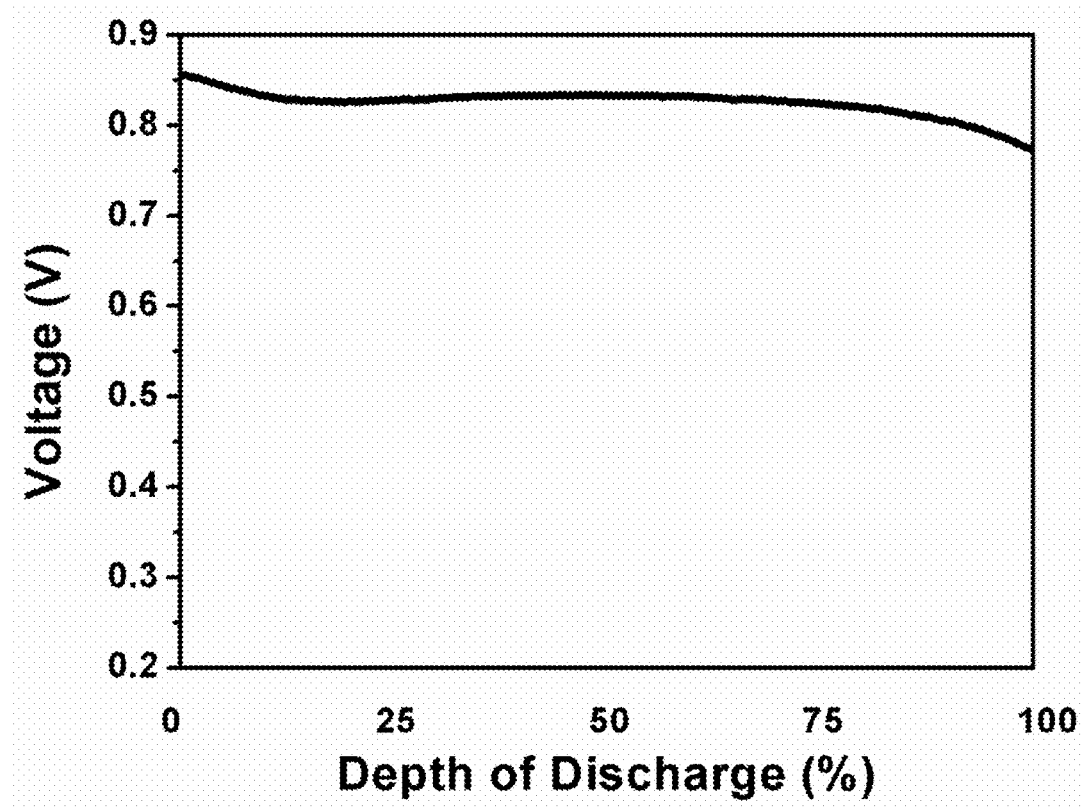
FIG. 11 The discharge curve (voltage vs. DoD) of a low-voltage Li—$Fe_3O_4$ cell.

M$_8$ (compound A$_y$B$_z$=Fe$_3$O$_4$) is a multivalent material that can accept/give multi electrons during redox reactions. The actual capacity is around 3,650 mAh/cm$^3$. When paired with a lithium anode, it gave the output voltage of ~0.83 V (FIG. 11). The voltage variation between 10% DoD and 90% DoD is ±3.3%.

Anode reaction: Li→Li$^+$+e$^-$
Cathode reaction: A$_y$B$_z$(M$_8$)+xe$^-$→yA(M$_8$)+zB(M$_8$)$^{(x/z)-}$
Full reaction: xLi$^+$+xe$^-$+A$_y$B$_z$(M$_8$)→yA(M$_8$)+zLi$_{(x/z)}$B(M$_8$)

EXAMPLE 9

Low-Voltage Na—Fe$_3$O$_4$ Cells

Figure 12:
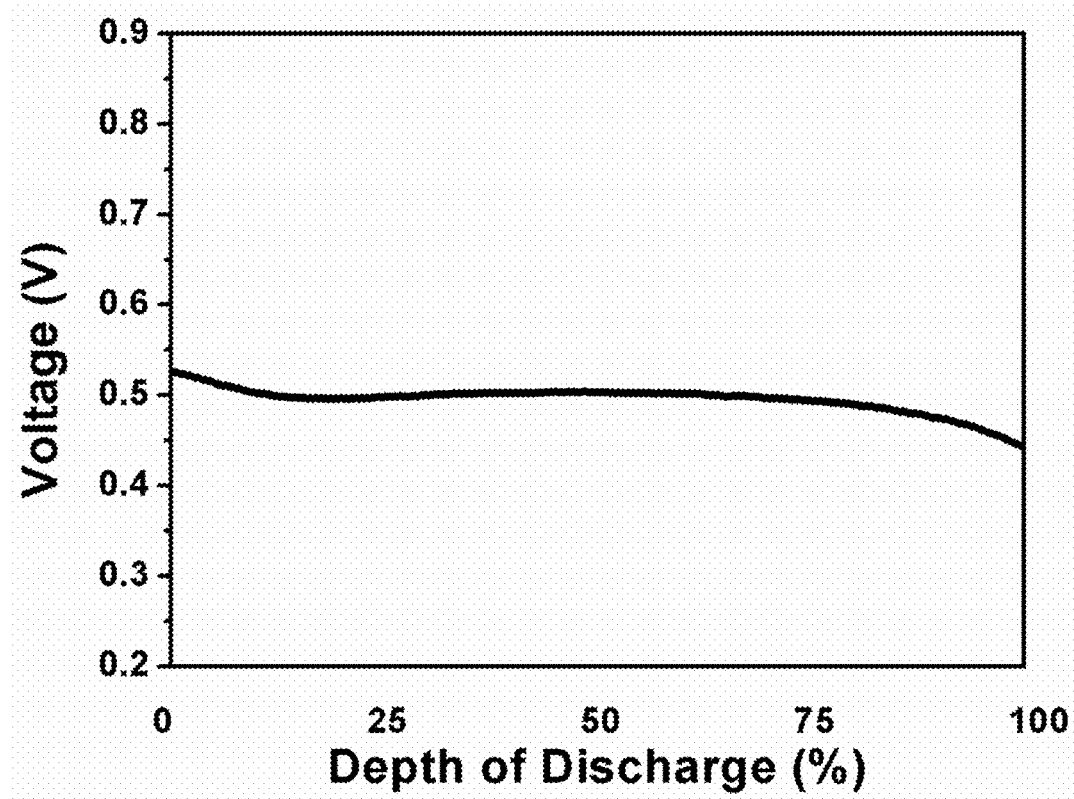
FIG. 12 The discharge curve (voltage vs. DoD) of a low-voltage Na—$Fe_3O_4$ cell.

M$_8$ (compound A$_y$B$_z$=Fe$_3$O$_4$) is a multivalent material that can accept/give multi electrons during redox reactions. The actual capacity is around 3,650 mAh/cm$^3$. When paired with a sodium anode, it gave the output voltage of ~0.5 V (FIG. 12). The voltage variation between 10% DoD and 90% DoD is ±3.3%.

Anode reaction: Na→Na$^+$+e$^-$
Cathode reaction: A$_y$B$_z$(M$_8$)+xe$^-$→yA(M$_8$)+zB(M$_8$)$^{(x/z)-}$
Full reaction: xNa$^+$+xe$^-$+A$_y$B$_z$(M$_8$)→yA(M$_8$)+zNa$_{(x/z)}$B(M$_8$)

EXAMPLE 10

Low-Voltage Li—Sn Cells

Figure 13:
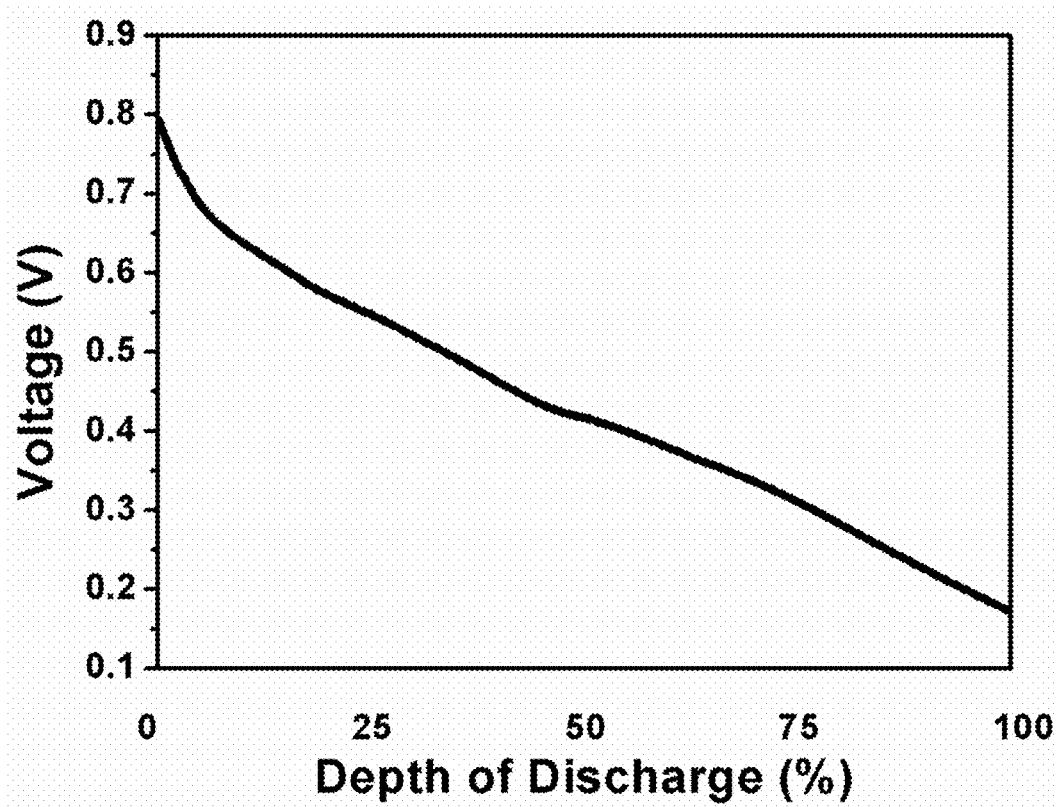
FIG. 13 The discharge curve (voltage vs. DoD) of a low-voltage Li—Sn cell.

M$_9$ (Sn) is a multivalent material that can accept/give multi electrons during redox reactions. The actual capacity is around 5,818 mAh/cm$^3$. When paired with a lithium anode, it gave the output voltage of ~0.42 V (FIG. 13). The voltage variation between 10% DoD and 90% DoD is ±48%.

Anode reaction: Li→Li$^+$+e$^-$
Cathode reaction: M$_9$+xe$^-$→M$_9^{x-}$
Full reaction: xLi$^+$+xe$^-$+M$_9$→Li$_x$(M$_9$)

EXAMPLE 10

Low-Voltage Li—Mn$_3$O$_4$ and Graphene-Modified Li—Mn$_3$O$_4$ Cells

Figure 14:
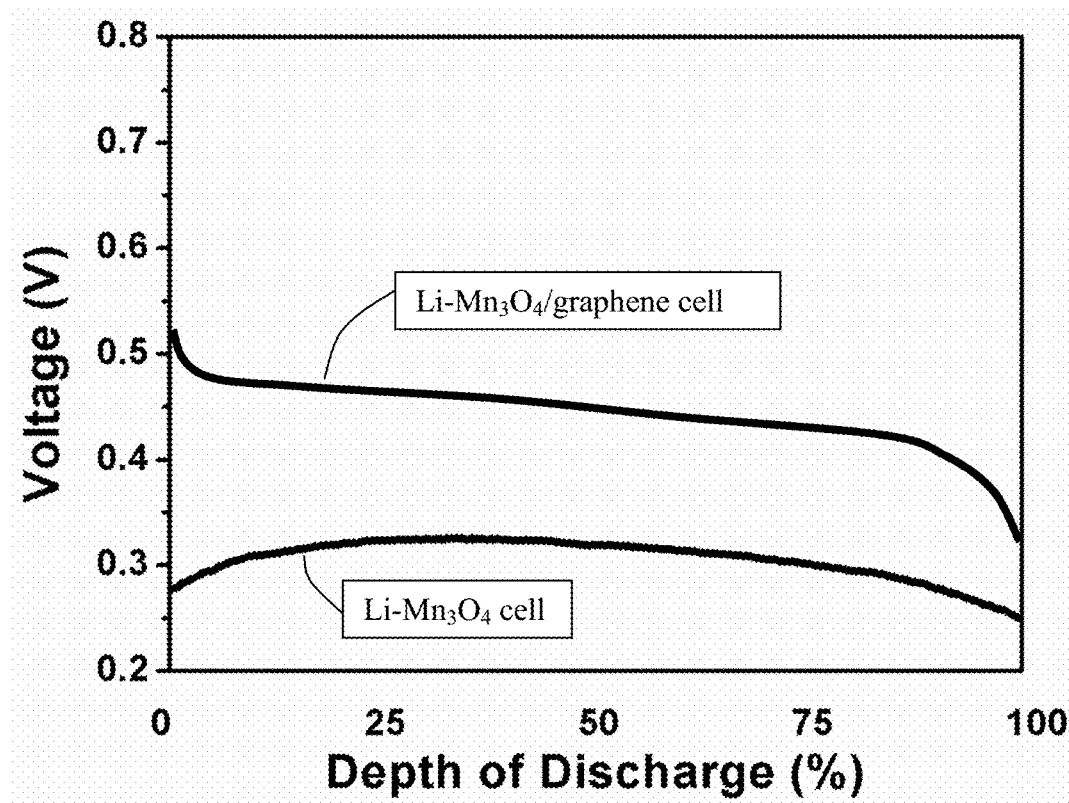
FIG. 14 The discharge curves (voltage vs. DoD) of a low-voltage Li-Mn$_3$O$_4$ cell and a graphene-modified cell (Li—Mn$_3$O$_4$/graphene cell).

M$_{10}$ (compound A$_y$B$_z$=Mn$_3$O$_4$) is a multivalent material that can accept/give multi electrons during redox reactions. The actual capacity is around 3,615 mAh/cm$^3$. When paired with a lithium anode, it gave the output voltage of ~0.32 V (FIG. 14). The voltage variation between 10% DoD and 90% DoD is ±6.5%. With the cathode active material (nano particles of Mn$_3$O$_4$) being bonded to nitrogenated graphene sheets, the cell output voltage is shifted up to a more useful range and the slope is also reduced (a better plateau of curve).

Anode reaction: Li→Li$^+$+e$^-$
Cathode reaction: A$_y$B$_z$(M$_{10}$)+xe$^-$→yA(M$_{10}$)+zB(M$_{10}$)$^{(x/z)-}$
Full reaction: xLi$^+$+xe$^-$+A$_y$B$_z$(M$_{10}$)→yA(M$_{10}$)+zLi$_{(x/z)}$B(M$_{10}$)

EXAMPLE 11

Figure 15:
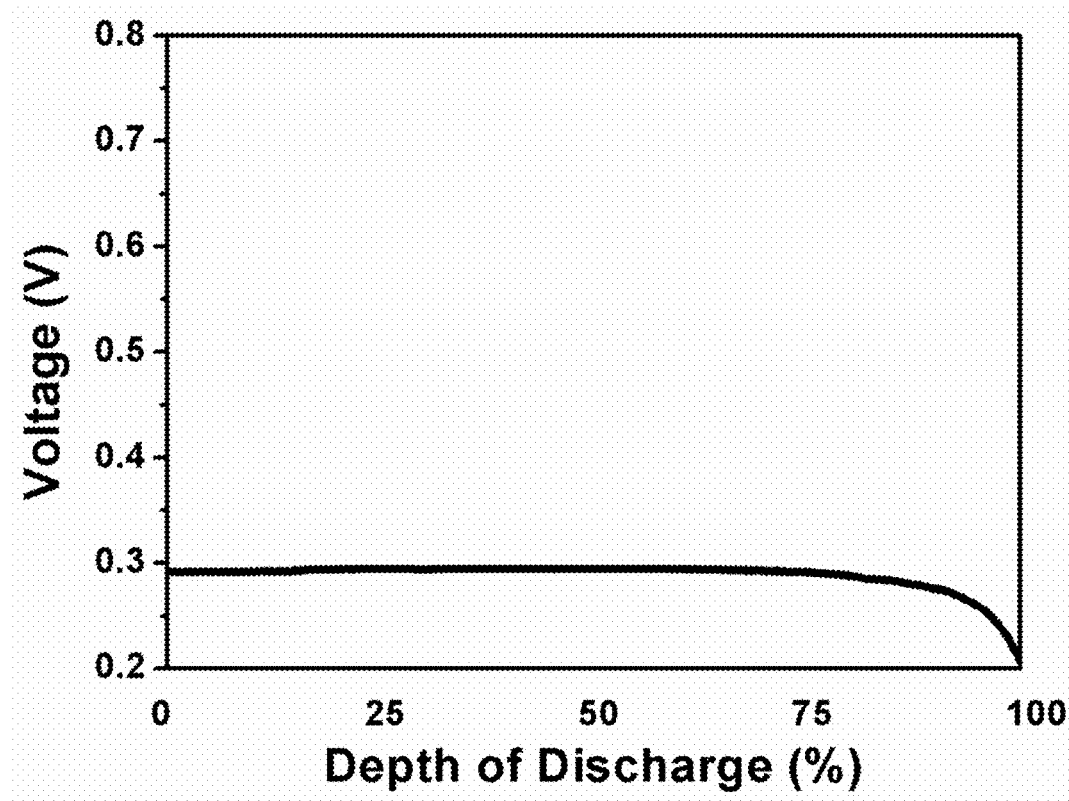
FIG. 15 The discharge curve (voltage vs. DoD) of a low-voltage Li—Al cell.

Low-Voltage Li—Al Cells $M_{11}$ (Al) is a multivalent material that can accept/give multi electrons during redox reactions. The actual capacity is around 2,748 mAh/cm³. When paired with a lithium anode, it gave the output voltage of ~0.30 V (FIG. 15). The voltage variation between 10% DoD and 90% DoD is ±1.8%.

Anode reaction: $Li \rightarrow Li^+ + e^-$
Cathode reaction: $M_{11} + xe^- \rightarrow M_{11}^{x-}$
Full reaction: $xLi^+ + xe^- + M_{11} \rightarrow Li_x(M_{11})$

EXAMPLE 12

Figure 16:
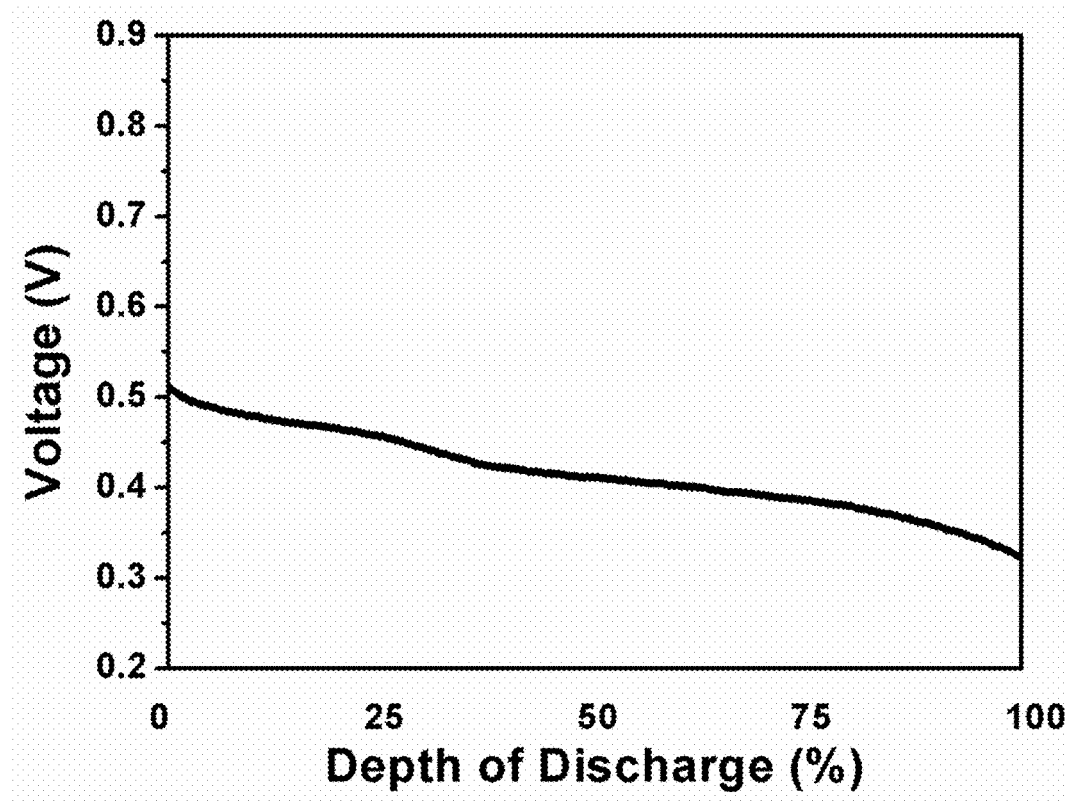
FIG. 16 The discharge curve (voltage vs. DoD) of a low-voltage Li—MoO$_3$ cell.

Low-Voltage Li—MoO₃ Cells $M_{12}$ (compound $A_yB_z=MoO_3$) is a multivalent material that can accept/give multi electrons during redox reactions. The actual capacity is around 3,503 mAh/cm³. When paired with a lithium anode, it gave the output voltage of ~0.41 V (FIG. 16). The voltage variation between 10% DoD and 90% DoD is ±14%.

Anode reaction: $Li \rightarrow Li^+ + e^-$
Cathode reaction: $A_yB_z(M_{12}) + xe^- \rightarrow yA(M_{12}) + zB(M_{12})^{(x/z)-}$
Full reaction: $xLi^+ + xe^- + A_yB_z(M_{12}) \rightarrow yA(M_{12}) + zLi_{(x/z)}B(M_{12})$

EXAMPLE 13

Figure 17:
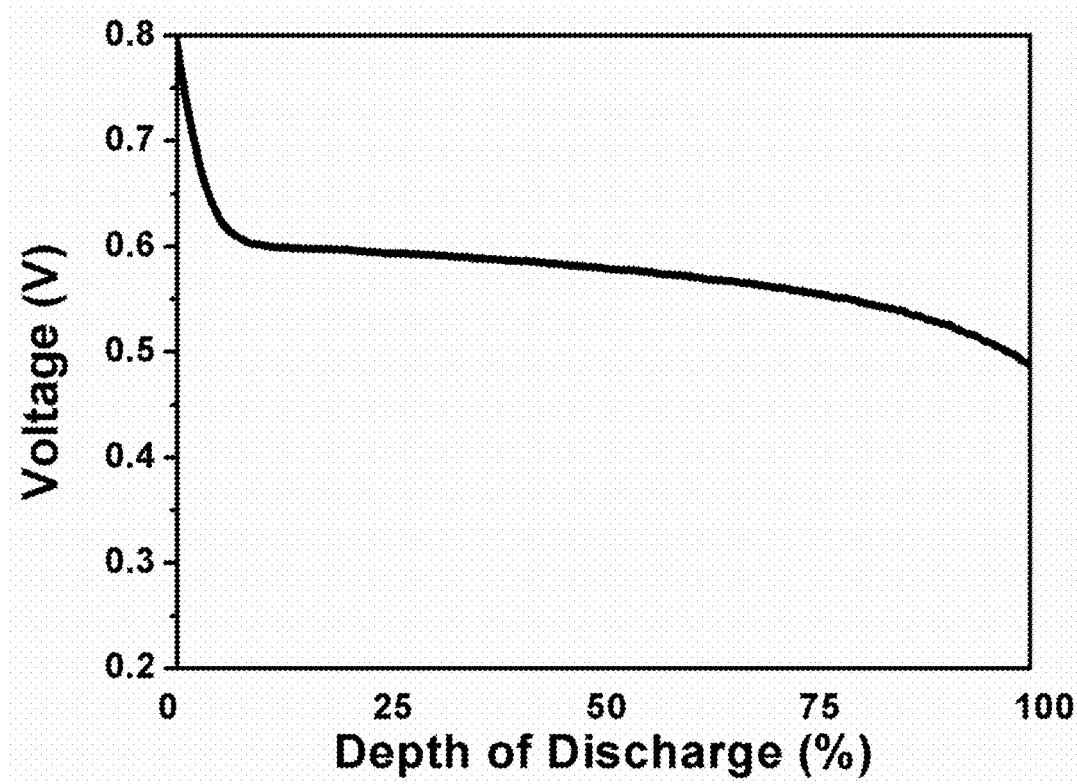
FIG. 17 The discharge curve (voltage vs. DoD) of a low-voltage Li—MoS$_2$ cell.

Low-Voltage Li—MoS₂ Cells $M_{13}$ (compound $A_yB_z=MoS_2$) is a multivalent material that can accept/give multi electrons during redox reactions. The actual capacity is around 2,509 mAh/cm³. When paired with a lithium anode, it gave the output voltage of ~0.58 V (FIG. 17). The voltage variation between 10% DoD and 90% DoD is ±6.4%.

Anode reaction: $Li \rightarrow Li^+ + e^-$
Cathode reaction: $A_yB_z(M_{13}) + xe^- \rightarrow yA(M_{13}) + zB(M_{13})^{(x/z)-}$
Full reaction: $xLi^+ + xe^- + A_yB_z(M_{13}) \rightarrow yA(M_{13}) + zLi_{(x/z)}B(M_{13})$

EXAMPLE 14

Preparation of Discrete Functionalized GO Sheets and Graphene Foam

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 5. After a drying treatment at 100° C. overnight, the resulting graphite intercalation compound (GIC) or graphite oxide fiber was re-dispersed in water-alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. Ammonia water was added to one pot of the resulting suspension, which was ultrasonicated for another hour to produce $NH_2$-functionalized graphene oxide (f-GO). The GO sheets and functionalized GO sheets were separately diluted to a weight fraction of 5% and a desired amount of $SnO_2$ particles (as an example of cathode active material in a low-voltage cell) was added to the suspensions. Subsequently, 2% baking soda as a blowing agent, was added to the GO/$SnO_2$ or f-GO/$SnO_2$ suspensions to form mixture slurries. The resulting slurries were allowed to stay in the container without any mechanical disturbance for 2 days.

The resulting slurries containing GO/$SnO_2$ or f-GO/$SnO_2$ were then comma-coated onto a PET film surface. The resulting coating films, after removal of liquid, have a thickness that was from 100 to 800 μm. The films were then subjected to heat treatments that involve an initial heat treatment temperature of 500° C. for 2 hours (in a mixture of $H_2$ and $N_2$) to enable formation of a foamed structure. This is followed by exposing the foam at a second temperature of 800-1,200° C. (in Ar gas atmosphere) for different specimens.

EXAMPLE 15

Preparation of Single-Layer Graphene Sheets From Meso-Carbon Micro-Beads (MCMBs) and Graphene Foam Meso-carbon microbeads (MCMBs) were supplied from China Steel Chemical Co., Kaohsiung, Taiwan. This material has a density of about 2.24 g/cm³ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. $MoO_3$ particles having diameter of 1-6 μm (another example of cathode active material) were added to the GO suspension. Baking soda (5-20% by weight), as a chemical blowing agent, was also added to the suspension just prior to casting. The suspension was then cast onto a glass surface using a doctor's blade to exert shear stresses, inducing GO sheet orientations. Several samples were cast, some containing a blowing agent and some not. The resulting GO films, after removal of liquid, have a thickness that can be varied from approximately 10 to 500 μm.

The several sheets of the GO film, with or without a blowing agent, were then subjected to heat treatments that involve an initial (first) thermal reduction temperature of 80-500° C. for 1-5 hours. This first heat treatment generated a graphene foam. The foam was then subjected to a second temperature of 750-950° C. for 4 hours.

EXAMPLE 16

Preparation of Pristine Graphene Film and Foam
(0% Oxygen)

Recognizing the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are essentially no other non-carbon elements.

Various amounts (0%-30% by weight relative to graphene material) of chemical bowing agents (N, N-Dinitroso pentamethylene tetramine or 4. 4'-Oxybis (benzenesulfonyl hydrazide) and $MoS_2$ particles (as an example of cathode active material) were added to a suspension containing pristine graphene sheets and a surfactant. The suspension was then slot die-coated onto a PET film surface, which involves shear stress-induced orientation of graphene sheets. The resulting graphene-Si films, after removal of liquid, have a thickness from approximately 100 to 750 μm.

The graphene films were then subjected to heat treatments that involve an initial (first) temperature of 80-1,500° C. for 1-5 hours, which led to the production of a graphene film (if 0% blowing agent) or foam layer (with some blowing agent). Some of the pristine foam samples were then subjected to a heat treatment at a second temperature of 700-2,500° C.

EXAMPLE 17

Preparation of Graphene Oxide (GO) Suspension
From Natural Graphite and Subsequent Preparation
of GO Foams Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction>3% and typically from 5% to 15%.

By dispensing and coating the GO suspension (containing particles of an anode or cathode active material) on a polyethylene terephthalate (PET) film in a slurry coater and removing the liquid medium from the coated film we obtained a thin film of dried graphene oxide. Several GO film samples were then subjected to different heat treatments, which typically include a thermal reduction treatment at a first temperature of 100° C. to 500° C. for 1-10 hours, and at a second temperature of 750-1,500° C. for 0.5-5 hours, followed by a controlled cool-down procedure. With these heat treatments, also under a compressive stress, the GO films were transformed into graphene foam.

On a separate basis, a certain amount of hydrazine, as a chemical reducing agent, was added to the GO suspension (containing active material particles) to obtain reduced GO (RGO) suspension. The RGO suspension was then subjected to a well-known vacuum-assisted filtration procedure to form RGO paper.

EXAMPLE 18

Preparation of Graphene Foams (Containing
Particles of an Anode or Cathode Active Material)
From Graphene Fluoride Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication times ensured better stability. Particles of an anode or cathode active material were then added to the dispersion. Upon casting on a glass surface with the solvent removed, the dispersion became a brownish film formed on the glass surface. When GF films were heat-treated, fluorine was released as gases that helped to generate pores in the film. In some samples, a physical blowing agent ($N_2$ gas) was injected into the wet GF film while being cast. These samples exhibit much higher pore volumes or lower foam densities. Without using a blowing agent, the resulting graphene fluoride foams exhibit physical densities from 0.35 to 1.38 $g/cm^3$. When a blowing agent was used (blowing agent/GF weight ratio from 0.5/1 to 0.05/1), a density from 0.02 to 0.35 $g/cm^3$ was obtained. Typical fluorine contents are from 0.001% (HTT=2,500° C.) to 4.7% (HTT=350° C.), depending upon the final heat treatment temperature involved.

EXAMPLE 19

Preparation of Graphene Foams (Containing Particles of an Anode or Cathode Active Material) from Nitrogenated Graphene Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. Particles of an anode or cathode active material were then added to the dispersion. The resulting suspensions were then cast, dried, and heat-treated initially at 200-350° C. as a first heat treatment temperature and subsequently treated at a second temperature of 1,500° C. The resulting nitrogenated graphene foams exhibit physical densities from 0.45 to 1.28 g/cm$^3$. Typical nitrogen contents of the foams are from 0.01% (HTT=1,500° C.) to 5.3% (HTT=350° C.), depending upon the final heat treatment temperature involved.

EXAMPLE 20

Characterization of Various Graphene Foams and Conventional Graphite Foam

The internal structures (crystal structure and orientation) of several dried GO layers, and the heat-treated films at different stages of heat treatments were investigated using X-ray diffraction. The X-ray diffraction curve of natural graphite typically exhibits a peak at approximately 2θ=26°, corresponds to an inter-graphene spacing ($d_{002}$) of approximately 0.3345 nm. Upon oxidation, the resulting GO shows an X-ray diffraction peak at approximately 2θ=12°, which corresponds to an inter-graphene spacing ($d_{002}$) of approximately 0.7 nm. With some heat treatment at 150° C., the dried GO compact exhibits the formation of a hump centered at 22°, indicating that it has begun the process of decreasing the inter-graphene spacing due to the beginning of chemical linking and ordering processes. With a heat treatment temperature of 2,500° C. for one hour, the $d_{002}$ spacing has decreased to approximately 0.336, close to 0.3354 nm of a graphite single crystal.

With a heat treatment temperature of 2,750° C. for one hour, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio<0.1, for all graphitic materials heat treated at a temperature lower than 2,800° C. The I(004)/I(002) ratio for the graphitic materials heat treated at 3,000-3,250° C. (e.g, highly oriented pyrolytic graphite, HOPG) is in the range of 0.2-0.5. In contrast, a graphene foam prepared with a final HTT of 2,750° C. for one hour exhibits a I(004)/I(002) ratio of 0.78 and a Mosaic spread value of 0.21, indicating a practically perfect graphene single crystal with a good degree of preferred orientation.

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our graphene foams have a mosaic spread value in this range of 0.2-0.4 when produced using a final heat treatment temperature no less than 2,500° C.

It is of significance to point out that a heat treatment temperature as low as 500° C. is sufficient to bring the average inter-graphene spacing in GO sheets along the pore walls to below 0.4 nm, getting closer and closer to that of natural graphite or that of a graphite single crystal. The beauty of this approach is the notion that this GO suspension strategy has enabled us to re-organize, re-orient, and chemically merge the planar graphene oxide molecules from originally different graphite particles or graphene sheets into a unified structure with all the graphene planes now being larger in lateral dimensions (significantly larger than the length and width of the graphene planes in the original graphite particles). A potential chemical linking mechanism is illustrated in FIG. 4. This has given rise to exceptional structural integrity, flexibility, high thermal conductivity and high electrical conductivity values, enabling graphene foam or film layer (containing an anode or cathode active material embedded therein) to function as a current collector as well. This obviates the need to have separate (additional) anode and cathode current collectors.

We claim:

1. An electrochemical battery cell comprising an anode having a primary anode active material, wherein said anode further includes graphene as a protective material, wherein said graphene comprises a pristine graphene material having less than 0.01% by weight of non-carbon elements or a non-pristine graphene material having 0.01% to 50% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof, wherein said primary anode active material is embedded in a graphene film, graphene paper, graphene mat, or graphene foam, wherein said graphene film, graphene paper, graphene mat, or graphene foam in said anode, having said primary anode active material embedded therein, is connected to a first battery terminal tab to function as an anode current collector and there is no separate or additional anode current collector to support said graphene film, graphene paper, graphene mat, or graphene foam, a cathode having a primary cathode active material, wherein said primary cathode active material is embedded in a graphene film, graphene paper, graphene mat, or graphene foam, wherein said graphene film, graphene paper, graphene mat, or graphene foam, in said cathode, having said primary cathode active material embedded therein, is connected to a second battery terminal tab and there is no separate or additional cathode current collector to support said graphene film, graphene paper, graphene mat, or graphene foam in said cathode, and an ion-conducting electrolyte in ionic contact with said anode and said cathode, wherein the electrochemical battery cell has an initial output voltage, Vi, measured at 10% depth of discharge, from a lower limit of 0.3 volts to an upper limit of 0.8 volts, and a final output voltage Vf measured at a depth of discharge no greater than 90%, wherein a voltage variation, (Vi-Vf)/Vi, is no greater than ±10% and the specific capacity between Vi and Vf is no less than 100 mAh/g or 200 mAh/cm$^3$ based on the cathode active material weight or volume, and wherein said primary anode active material is sodium (Na), and wherein said primary cathode active material is a metal oxide selected from the group consisting of oxides of tin (Sn), bismuth (Bi), antimony (Sb), indium (In), tellurium (Te), phosphor (P), magnesium (Mg), aluminum (Al), zinc (Zn), titanium (Ti), manganese (Mn), iron (Fe), vanadium (V), cobalt (Co), nickel (Ni), selenium (Se), a mixture thereof, an alloy thereof, or a combination thereof.

2. The electrochemical battery cell of claim 1, wherein the specific capacity between Vi and Vf is no less than 200 mAh/g or 400 mAh/cm$^3$ based on the cathode active material weight or volume.

3. The electrochemical battery cell of claim 1, wherein the specific capacity between Vi and Vf is no less than 400 mAh/g or 800 mAh/cm$^3$ based on the cathode active material weight or volume.

4. The electrochemical battery cell of claim 1, wherein the specific capacity between Vi and Vf is no less than 1,000 mAh/g or 2,000 mAh/cm$^3$ based on the cathode active material weight or volume.

5. The electrochemical battery cell of claim 1 wherein said primary anode active material also includes Mg or Al and the primary cathode active material is sulfur (S), a mixture of S and Se, or sulfur bonded to graphene surfaces and said electrolyte is selected from aqueous, organic, polymeric, or solid state electrolyte.

6. The electrochemical battery cell of claim 1, wherein said metal oxide is selected from a tin oxide, cobalt oxide, nickel oxide, manganese oxide, vanadium oxide or a combination thereof and optionally further comprises a material selected from the group consisting of iron phosphate, manganese phosphate, vanadium phosphate, transition metal sulfide, and combinations thereof.

7. The electrochemical battery cell of claim 1, wherein said cathode further comprises graphene.

8. The electrochemical battery cell of claim 7, wherein said primary cathode active material is bonded to or physically supported by a surface of said graphene.

9. The electrochemical battery cell of claim 7, wherein said graphene comprises a pristine graphene material having less than 0.01% by weight of non-carbon elements or a non-pristine graphene material having 0.01% to 50% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

10. The electrochemical battery cell of claim 1, wherein the voltage variation, (Vi-Vf)/Vi, is no greater than ±5%.

11. An electronic device comprising the electrochemical battery cell of claim 1 as a power source.

12. The electronic device of claim 11, which comprises a sensor, an actuator, a wireless device, a wearable device, or a medical device electronically connected to said electrochemical battery cell.

13. An electrochemical battery cell comprising an anode having a primary anode active material, a cathode having a primary cathode active material, and an ion-conducting electrolyte in ionic contact with said anode and said cathode, wherein the electrochemical battery cell has an initial output voltage, Vi, measured at 10% depth of discharge, from a lower limit of 0.3 volts to an upper limit of 0.8 volts, and a final output voltage Vf measured at a depth of discharge no greater than 90%, wherein a voltage variation, (Vi-Vf)/Vi, is no greater than ±10% and the specific capacity between Vi and Vf is no less than 100 mAh/g or 200 mAh/cm$^3$ based on the cathode active material weight or volume, and wherein said primary anode active material is sodium (Na), and wherein said primary cathode active material is a metal oxide selected from the group consisting of oxides of tin (Sn), bismuth (Bi), antimony (Sb), indium (In), tellurium (Te), phosphor (P), magnesium (Mg), aluminum (Al), zinc (Zn), titanium (Ti), manganese (Mn), iron (Fe), vanadium (V), cobalt (Co), nickel (Ni), selenium (Se), a mixture thereof, an alloy thereof, or a combination thereof, wherein said primary cathode active material is embedded in a graphene film, graphene paper, graphene mat, or graphene foam.

* * * * *